US009116950B2

(12) United States Patent
Work

(10) Patent No.: US 9,116,950 B2
(45) Date of Patent: Aug. 25, 2015

(54) METHOD AND APPARATUS FOR INTERNET-BASED HUMAN NETWORK BROKERING

(71) Applicant: James Duncan Work, Ashville, NC (US)

(72) Inventor: James Duncan Work, Ashville, NC (US)

( * ) Notice: Subject to any disclaimer, the term of this patent is extended or adjusted under 35 U.S.C. 154(b) by 0 days.

(21) Appl. No.: 14/315,215

(22) Filed: Jun. 25, 2014

(65) Prior Publication Data

US 2014/0310355 A1 Oct. 16, 2014

Related U.S. Application Data

(63) Continuation of application No. 13/476,882, filed on May 21, 2012, now Pat. No. 8,812,604, which is a continuation of application No. 12/757,953, filed on Apr. 9, 2010, now Pat. No. 8,209,374, which is a continuation of application No. 09/852,336, filed on May 8, 2001, now Pat. No. 7,725,525.

(60) Provisional application No. 60/203,374, filed on May 9, 2000.

(51) Int. Cl.
*G06F 17/30* (2006.01)
*G06Q 10/10* (2012.01)
*G06Q 50/00* (2012.01)
*H04L 12/58* (2006.01)

(52) U.S. Cl.
CPC .......... *G06F 17/30424* (2013.01); *G06Q 10/10* (2013.01); *G06Q 50/01* (2013.01); *H04L 51/32* (2013.01)

(58) Field of Classification Search
CPC .............. G06F 17/30424; H04L 51/32; H04L 29/0683
See application file for complete search history.

(56) References Cited

U.S. PATENT DOCUMENTS

| | | | |
|---|---|---|---|
| 6,798,380 B2 * | 9/2004 | Li et al. .......................... | 342/368 |
| 6,879,985 B2 * | 4/2005 | Deguchi et al. ....................... | 1/1 |
| 7,539,697 B1 * | 5/2009 | Akella et al. ........................... | 1/1 |
| 7,613,769 B1 * | 11/2009 | Hess ............................ | 709/203 |
| 2002/0145626 A1 * | 10/2002 | Richards et al. .............. | 345/741 |
| 2002/0178161 A1 * | 11/2002 | Brezin et al. .................... | 707/10 |
| 2012/0239764 A1 * | 9/2012 | Galbreath et al. ............ | 709/206 |

* cited by examiner

*Primary Examiner* — Krisna Lim
(74) *Attorney, Agent, or Firm* — Ascenda Law Group, PC

(57) ABSTRACT

Matches between search queries and potential targets of such search queries are automatically brokered by (i) comparing search criteria specified in the search queries with profile criteria describing the potential targets, and (ii) reporting instances of acceptable correspondence between the search criteria and the profile criteria, provided that access controls associated with the profile criteria of the targets permit such reporting in light of access levels assigned to the search inquiries. Initiators, using client applications at various remote locations, may formulate the search queries and the brokering may be performed at one or more server locations communicatively coupled (e.g., via the Internet) thereto. The profile criteria may include portions of rich descriptive profiles of the potential targets.

6 Claims, 9 Drawing Sheets

Fig. 7

| ND | Person | Organization | Email | Phone |
|---|---|---|---|---|
| | Albert, Dick | Community Development Inter... | dalbe@commun.com | 2-219-0087 |
| | Allen, Harrison | Allen and Associates | halle@allen.com | (301)469-9269 |
| | Biel, Sue | Marketing Associates | sbiel@market.com | (212)724-9217 |
| | Black, Mary | Black and Associates | mblac@black.com | (203)791-3999 |
| | Bonaire, Madelyn | Bonaire Consulting | mbona@bonair.com | (301)371-7100 |
| | Boston, Jane | Hartplace Consulting | jane@hartplace.com | (202)628-4323 |
| | Dinterson, Thomas | Down River Ventures | tdint@downr.com | (617)487-7060 |
| | Gladinsky, Steve | United Nations Development P... | sglad@united.com | (212)906-6337 |
| | Hartfelt, Marvin | The World Bank Group | mhart@thewo.com | (202)473-0687 |
| | Allen, Harrison | Allen and Associates | halle@allen.com | (301)469-9269 |
| | Biel, Sue | Marketing Associates | sbiel@market.com | (212)724-9217 |
| | Black, Mary | Black and Associates | mblac@black.com | (203)791-3999 |

METHOD AND APPARATUS FOR INTERNET-BASED HUMAN NETWORK BROKERING

RELATED APPLICATION

This application is a CONTINUATION and claims the priority benefit of U.S. application Ser. No. 13/476,882, filed May 21, 2012, incorporated herein by reference in its entirety, which is a continuation of U.S. application Ser. No. 12/757,953, filed Apr. 9, 2010, now U.S. Pat. No. 8,209,374, which is a continuation of U.S. application Ser. No. 09/852,336, filed May 8, 2001, now U.S. Pat. No. 7,725,525, which is a non-provisional and claims the priority benefit of U.S. Provisional Application No. 60/203,374, filed May 9, 2000, all of which are incorporated herein by reference.

FIELD OF THE INVENTION

The present invention relates to a "people-networking" scheme that may be embodied in computer software and/or hardware and that can be characterized as both a browser and broker of human networks on the Internet. When used in a computer network environment employing a client-server architecture, a client-side software application may act as a browser and relationship manager while a server component may act as a broker. When used in a peer-to-peer or distributed server architecture, the broker function can be distributed.

BACKGROUND

In the course of conducting their everyday affairs (whether personal or business), people generally access their networks of contacts for referrals, information and/or advice. For example, when choosing a physician, one might check with friends or relatives about past experiences with certain doctors. When seeking a new employee, a potential employer will often check with colleagues to see whether they know of a suitable candidate. And, when investigating new investment opportunities, an investor may consult with professional advisors as to the prospects of the target company.

In each of these and many other examples, an individual's decisions are often made easier by the advice of trusted associates and friends, but often that individual finds he or she does not have an appropriate contact with the information needed to help with a problem or task. At such times, the individual may ask his or her contacts for leads to contacts in their own "human networks". This presents a quandary for the person asked for a referral—namely, whether or not to reveal his or her contacts to the requestor. By making such revelations, the "connector" may compromise his or her network or expose one or more of his or her contacts to unwanted solicitations. By not making the referral, however, the connector may risk his or her association with the person seeking the referral. Whether or not to make the referral often depends upon the degree of trust that the connector has in the person seeking the referral and any past experiences in making such referrals to the target referee.

Even where the referral is ultimately made, there is no guarantee that the referee is going to be a suitable candidate for the original requestor's purpose. Thus, the requestor may be forced to track down a number of leads (many of which may be unsuitable) in the hope of finding a suitable target. This process is rather inefficient, usually because a) the requestor does not have enough information about the contacts of his or her contacts in order to determine which contacts to approach for referrals, and/or b) the requestor has failed to properly elucidate his or her requirements and/or because the requestor was not provided with sufficient information regarding the potential target to be able to eliminate him or her from further consideration. In other words, the profiles of the desired target and the resulting candidates were not sufficiently developed to meaningfully assist in the selection process.

Nevertheless, despite these shortcomings, human networks are central to most, if not all, value-creating activities and operate at multiple levels, including personal networks (the personal and professional contacts each of us has), organizational networks (links within and between organizations), and associations and interest groups (people attracted by common values, interests, and goals). Today, many individuals may also be regarded as existing online community members, members of organizational networks (independent consultants, alliances, partnerships, consortiums, associations) or employees of small to large companies. They engage in human development, organizational learning, training, management, brokering, marketing, sales, trade, research, and consulting activities, all of which depend, to some degree, on inter-human networks. Such individuals generally understand the value of computer networks as tools for sharing information, but presently these individuals have only limited access to tools that can give them an edge (e.g., a competitive advantage) to make better human network connections on the Internet.

Others have recognized some of these deficiencies and have proposed partial solutions. For example, U.S. Pat. No. 6,115,709 to Gilmour and Wang proposes a method of constructing a user knowledge profile, having distinct public and private portions with different access restrictions. In an automated knowledge management system, electronic documents (e.g., e-mail messages and the like) are collected and each is associated with a user, such as for example the author of the document. Further, confidence levels are assigned to content within these documents and such content may be potentially indicative of a knowledge base of the user. The content is then stored in either the public or private portion of the user's knowledge profile depending upon whether the confidence level exceeds, or falls below, a predetermined threshold level. The public portion of the user knowledge profile is freely accessible by third parties, whereas the private portion has restricted access. Individual users' knowledge profiles may then be accessed (according to public/private access control restrictions) to determine whether a user is an appropriate candidate for a task (e.g., receipt of an e-mail message).

A related U.S. Pat. No. 6,205,472, to Gilmour, describes a scheme for querying a user profile. Access begins with the public portion of a user's knowledge profile for each of a plurality of potential targets of the electronic document. A matching operation is performed between a document term within the electronic document and public knowledge terms within the public portion of each knowledge profile to identify a first set of targets for which a match exists between the document term and at least one public knowledge term. The first set of targets is published to the originator. Responsive to a second query from the originator, the private portion of a knowledge profile for each of the plurality of potential targets of the electronic document is accessed, the private portion of each knowledge profile including private knowledge terms indicative of a knowledge base of a potential target of the electronic document. A second matching operation between the document term within the electronic document and the private knowledge terms within the private portion of each knowledge profile is performed to identify a second set of targets for which a match exists between the document term and at least one private knowledge term. Each target of the second set of targets is then prompted for authorization to be published to the originator.

These two examples of prior schemes for leveraging human network characteristics (in this case a worker's prior access to information of interest in a current electronic document) show the benefit of using automated means to assist in decision-making processes regarding the use of such networks. However, these schemes do not assist in the forming of relationships or introductions among members of disparate human networks nor do they provide for the brokering function discussed above, which is critical to the exchange of social capital among individuals.

The above-cited patents are not the only examples of schemes that attempt to address the social networking needs of people. Other schemes, which generally fall into one or more of a few categories, also exist. Among these are access control systems which generally allow only intended users to have access to information. Such systems may make use of encryption schemes such as public/private key encryption schemes.

Other methods of access control include the following.
1. Simple access that is either open or closed. In such schemes, users who have access to the system can "see" everything. Those without access to the system can, of course, see nothing. Access to the system is most often implemented by issuing a password, and in more rigorous systems also by a means of authentication using encrypted certificates issued by trusted third-party certificate authorities.
2. Schemes wherein data is separated into public and private designations. In these systems, users can designate some data areas as public and others as private. If others request access to data stored in private areas, the system will deny the request. Or in other implementations, the system may ask the user that designated the data as being private in the first place to decide whether or not to permit the requested access.
3. In a variation of the above scheme, data areas may be designated as either "public" or "private" and individuals are given either public or private access rights. Anyone can see public data areas while only persons given private access rights can see both public and private areas. One organization that appears to have implemented a scheme that makes use of this access control model is PeopleStream, Inc.
4. Use of multiple access groups to which specific people and other groups are assigned. This is similar to (3) above, except the system allows many different kinds of groups to be defined and applied to different documents, directories, or fields. This type of system is best managed by a professional system administrator because it is quite tedious to administer. Users have to be assigned individually to multiple groups
5. Role-based access control. Access groups are defined not just by specific people but also by specific roles. Whoever currently has a specific role has the access rights assigned to that role. This system usually also requires a separate method to authenticate that a particular person has a particular role.

In addition to access control schemes, other profiling systems do exist. Such systems (e.g., as deployed in Microsoft's Passport and Novell's DigitalMe) are mainly used as adjuncts to eCommerce technologies and provide some limited contact book updating capabilities. Also, so-called "expert finding" systems (e.g., as deployed by Abuzz Technologies, Inc., Tacit Knowledge Systems, Inc. and others) generally lack the sophisticated software agents needed for true social networking and provide only an enhanced resume finding service. In many of these services, access controls to personal information are limited and little or no verification of user information is provided. Referral networks services, such as those developed by PeopleStream, ContactMaps, Six Degrees and others, include only limited user profiles and verification capabilities.

SUMMARY OF THE INVENTION

In one embodiment, matches between search queries and potential targets of such search queries are automatically brokered by (i) comparing search criteria specified in the search queries with profile criteria describing the potential targets, and (ii) reporting instances of acceptable correspondence between the search criteria and the profile criteria, provided that access controls associated with the profile criteria of the targets permit such reporting in light of access levels assigned to the search inquiries. Initiators, using client applications at various remote locations, may formulate the search queries and the brokering may be performed at one or more server locations communicatively coupled (e.g., via the Internet) thereto. The search criteria may include portions of descriptive profiles of the potential targets. The descriptive profiles may include some or all of an individual's capabilities, history, values, interests, style, goals, projects, human networks, contacts, profiles of said contacts, employment history, education history, organizational activities, organizations, profiles of said organizations, or compensation requirements, and indications of the nature and strength of the relationship of the searcher to the target and/or to the target's organization.

Further, personal access controls may be set by users and uploaded along with their personal profile information to one or more of the servers. When the broker agent matches one user's profile information as a target to another user's search, the broker agent will then follow the instructions embedded in the target's access instructions to determine how or whether the target wants to respond to the search. Such access instructions specified in advance by targets may refer to access controls related to the nature of the search and/or to the searcher's profile information that the searcher has permitted to be shared with potential targets. Access controls specified by either the searcher or targets may permit exchange of information only on an anonymous basis, or with identity revealed. If either searcher or target has included instructions to remain anonymous, then the broker agent will enable an anonymous exchange of email between the searcher and target.

In contrast, to the above-noted access control schemes, the present method of access control can best be described as concept-based access control and has the following advantages over other methods. First, the present system makes it relatively easy for users to get started with a pre-defined basic set of access groups and corresponding security settings, and also relatively easy for users to create more sophisticated access controls by creating new access groups defined by rules that relate to profile elements and indicators or relationship that are entered by users. Second, being based on rule-created concepts that are defined by data users enter about themselves and about their relationships, i.e., profile and contact information, the present access groups require less administration, that is, less manual assignment of specific people to specific groups.

The present method also enables autonomous determination of access by users' personal access agents and by network broker agents acting on servers, even in cases where a request for access is coming from a person whom the protected user does not yet know, or for whom the user has not yet personally assigned to any access groups. The method also enables flexible reuse of access groups as defining concepts inside of other rules and definitions having multiple potential uses, including use in determining access to view profile elements, use in determining action that the network broker should take when responding to a search that the user matches as a target, and use in constructing criteria to define desired targets of a search.

The client applications may include search agents configured to assist initiators in generating the search queries using one or more graphical user interfaces. The search agents may perform such assistance by prompting an initiator for information regarding one or more of the initiator's goals, projects, weighted search criteria, extent of desired search, search context, organization type, or profession.

The brokering function may be performed using broker agents at one or more of the server locations. Such broker agents may be configured to receive search instructions within the search queries and to use these search instructions along with the access controls to find matches. The broker agents may be further configured to report any matches to the search initiators as paths to information regarding the potential targets, including reporting paths of relationships between the searcher and the target, such as a personal contact of the searcher who knows the target or who has a contact who knows the target.

Further, the broker agents may be configured to search for such matches within user profiles and contact information maintained at the server locations or elsewhere. The user profiles maintained at the servers generally include portions of descriptive profiles of the potential targets, which profiles may include some or all of an individual's capabilities, history, values, interests, style, goals, projects, human networks, contacts, profiles of said contacts, employment history, education history, organizational activities, organizations, profiles of said organizations, or compensation requirements. These user profiles may also include or be associated with the above-mentioned access controls.

In some cases, the broker agents may be configured to search for any matches according to degrees of trust between contacts, or other measures of relationship, as specified through the user profiles. Furthermore, the broker agents may be set to report verification information for any matches, such verification information being derived using verification agents located at the server locations. When used, the verification information should be editable only by the verification agents.

Different search strategies may be employed. For example, the broker agents may be configured to search for matches by beginning with contacts of the initiators and working outward to find potential targets or connectors to potential targets. Alternatively, or in addition, the broker agents may search for matches by beginning with potential targets and working backwards to find connectors to the search initiators. In other cases, the broker agents may be configured to search for connectors between such initiators and any potential targets, so long as the connectors have suitable access levels to permit reporting of any subsequent matches in light of any applicable access controls. Connectors may include contacts of the potential targets, contacts of the initiators, contacts of specified degree of the initiators or potential targets, profiles of organizations of the initiators, organizations of the initiators, or trusted connection paths between the initiators and any potential targets.

In a further embodiment, a computer network includes one or more clients configured with client applications, and one or more servers communicatively coupled to some or all of these clients and to one or more of each other. The client applications are each configured to permit users thereof to initiate search queries for potential targets specified by profile criteria (e.g., including some or all of an individual's capabilities, history, values, interests, style, goals, projects, human networks, contacts, profiles of said contacts, employment history, education history, organizational activities, organizations, profiles of said organizations, or compensation requirements). The servers include a network broker configured to search for matches between the search queries and potential targets thereof by comparing search criteria specified in the search queries with the profile criteria describing the potential targets and reporting instances of acceptable correspondence between the two where access controls associated with the profile criteria of the potential targets permit it, in light of access levels assigned to the search inquiries.

The client applications may be further configured to permit users thereof to initiate such search queries through one or more graphical user interfaces. In addition, users may be permitted to create and store profiles of themselves and their contacts, these profiles containing some or all of an individual's capabilities, history, values, interests, style, goals, projects, human networks, contacts, profiles of said contacts, employment history, education history, organizational activities, organizations, profiles of said organizations, or compensation requirements. The users may restrict access to these profiles using the access controls and any or all of these profiles may be uploaded to one or more of the servers. These uploaded copies of the profiles may then be used by the network broker when searching for matches.

The network broker may be configured to report any matches to the users as paths to information regarding potential targets. In general, the network broker receives search instructions within the search queries and uses these instructions, along with the access controls, to find the matches. The network broker may search for matches according to degrees of trust between contacts as specified through the target profile criteria and may also report verification information for any matches. Alternatively, or in addition, the network broker may search for matches by beginning with contacts of the users and working outward to find potential targets or connectors to potential targets, and/or by beginning with any potential targets and working backwards to find connectors to the users. Further, the network broker may be configured to search for connectors between users and potential targets, so long as the connectors have suitable access levels to permit reporting of any matches in light of the access controls.

Any or all of the above methods may be embodied as computer-readable instructions on computer-readable media for use by computer systems. This may include physical media, such as CD-ROMs and the like, or other media, such as packetized communications transmitted by electrical signals over communication links, both wired and wireless.

BRIEF DESCRIPTION OF THE DRAWINGS

The present invention is illustrated by way of example, and not limitation, in the figures of the accompanying drawings in which like reference numerals refer to similar elements and in which:

FIG. 7 illustrates one example of a contact list for use with a client application configured in accordance with an embodiment of the present invention.

FIG. 8 illustrates one example of a search result table which may be returned in response to a request for such information in accordance with an embodiment of the present invention.

FIG. 9 illustrates one example of a detailed search result description which may be displayed in response to a request therefor in accordance with an embodiment of the present invention.

DETAILED DESCRIPTION

Figure 1:
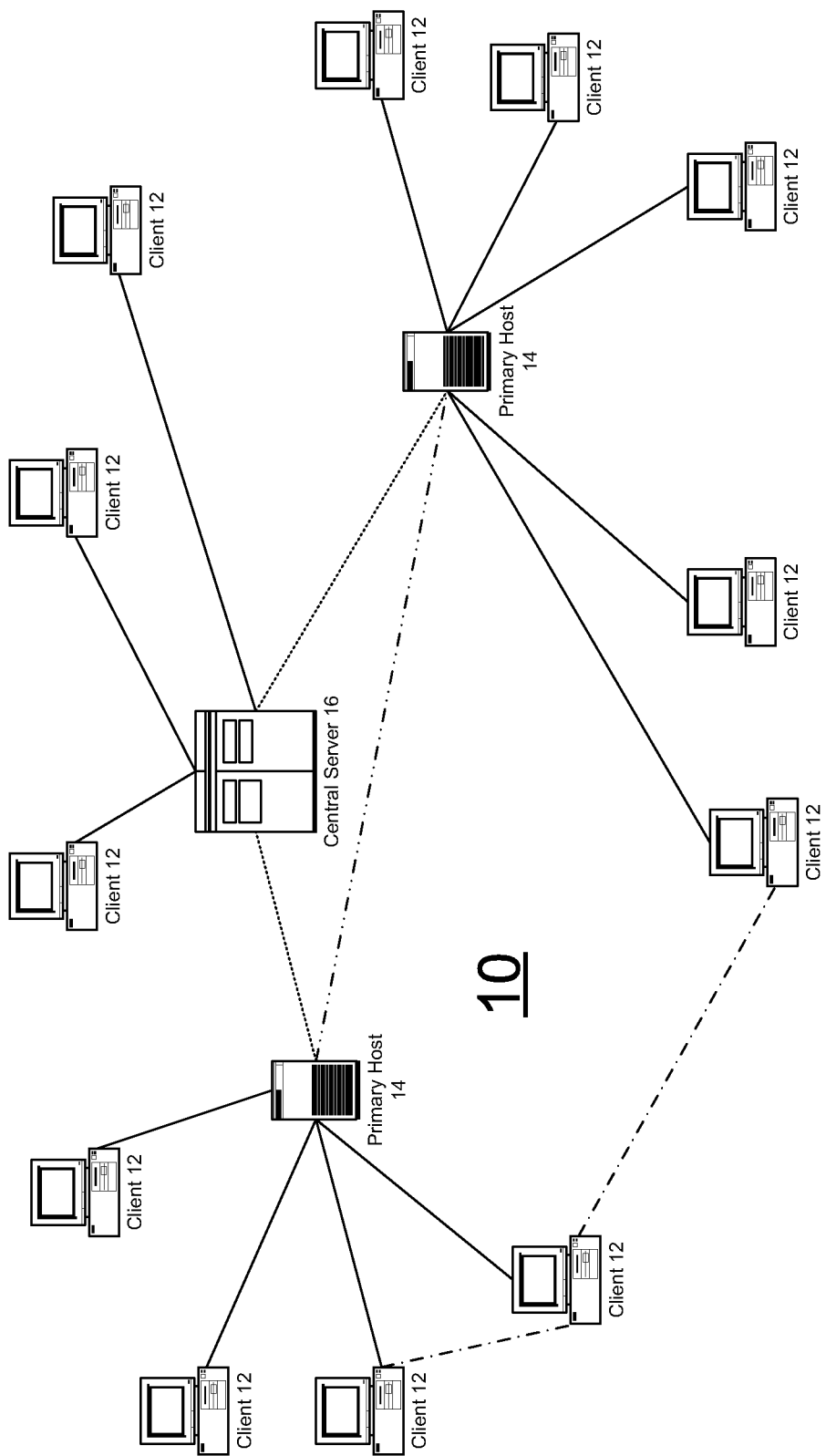
FIG. 1 illustrates a network of computer-based components configured as clients and servers in accordance with an embodiment of the present invention.

A scheme for brokering human networks over a computer network that may use a client-server paradigm is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

Some portions of the detailed description that follows are presented in terms of algorithms and symbolic representations of operations on data within a computer memory (e.g., using flowcharts and the like). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, objects, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. The various objects, data structures, algorithms, etc. described herein may be stored as computer-readable instructions on computer-readable media in the conventional fashion.

The present brokering scheme includes an Internet-based social networking tool for online communities, professional networks, and corporate intranets. Social networks are networks of people connected by trust, shared values, and mutual need for cooperation. Social communities, cooperative business relationships, and professional associations are all examples of social networks. The present system creates social networks to find partners, clients and people with shared interests and values. This system is also used to share knowledge, build and strengthen communities, build teams, and map and analyze complex organizational networks.

Information networking tools now available on the Internet are inadequate to serve the needs of social networks. As exemplified by the above-cited U.S. patents, information networking tools, including tools for "knowledge management", currently look for relationships between words. But social networking tools have to also reveal relationships between people in order to provide real value. This is why a directory of people and their expertise is generally not enough to evaluate a potential relationship. For most important relationships—potential partners, significant clients and suppliers, etc.—more information is needed to establish trust, mutual values, and other forms of compatibility. And, yet, since some of this information is personal or proprietary, social networking tools also have to ensure privacy and protection.

The present system resolves this apparent contradiction (between the need to reveal sufficient information about one's self and/or one's contacts to enable intelligent decision making and the desire to protect such information from unintended or undesired disclosure) with a design that combines extensive knowledge of social networks with software agents. Working together, the present tools provide for rich profiling, access control, verification, and network brokering to assure that privacy will not be compromised and that matches will be accurate and valuable to both parties.

Within and using the present brokering scheme, users are able to:

Quickly narrow the choices in finding and evaluating new partners, clients, colleagues, suppliers, employers, employees, investors, advisors and information sources, and people with shared interests and values by learning enough about them to properly evaluate their potential.

Get recommendations and introductions from a trusted source to build extended networks based on trust and value.

Screen incoming information and requests and maintain privacy when desired.

Connect with more of the right people to foster new relationships

The present brokering scheme offers users a rich environment to create and maintain all types of human networks supported by online interactions. When used in a client-server paradigm, the client-side tool may be embodied as a Java™ application or a Java applet that works within a conventional Web browser (e.g., Microsoft's Internet Explorer™ and/or Netscape's Navigator™ or Communicator™), thus offering a rich profiling environment for sharing information. The corresponding Web application server may then be made up of access agent and network broker intelligent agents (again based on Java technology) that are trainable to emulate the functions of a human broker, making highly accurate matches while protecting personal privacy. Of course, other embodiments may make use of other programming languages, such as conventional HTML or other languages.

Java is a form of an object-oriented (i.e., focused on data and the interfaces to it), dynamic programming language for computer systems developed by Sun Microsystems of Mountain View, Calif. Java has an extensive library of subroutines for coping with TCP/IP (transmission control protocol/Internet protocol) protocols like HTTP (hypertext transfer protocol) and FTP (file transfer protocol). Thus, Java applications can open and access objects (i.e., data) across the Internet (or other computer networks) via URLs (uniform resource locators, also known as web addresses) similar to the way other software can access a local file system. Because Java was designed to support applications on networks, which may be composed of a variety of systems with a variety of central processing unit (CPU) and operating system architectures, all Java programs are compiled to an architecture- or platform-neutral object file format. Thus, the compiled code is executable on many processors.

A. System Operation and Architecture

Before describing the features of systems which incorporate the present invention in detail, some background is helpful. In one embodiment, the brokering system operates as follows: Initially, users create rich profiles (e.g., of themselves and their contacts) needed for greater visibility and more accurate matching and evaluation of new connections. These profiles may be created using a profile builder application and may be both locally stored (e.g., on a user's personal computer) and/or uploaded on one or more application servers that may reside on an intranet or a Web server for an online community. Users instruct their personal access agents to control access to their own personal profiles and a personal search agent to find desired connections. A network broker agent operating on the server(s) is then used to evaluate matches and broker relationships. All parties can trust the broker to follow their instructions regarding the match desired and the degree of privacy desired. Other embodiments may be deployed as part of a peer-to-peer environment or other computer network. Note that as used herein the term "server" (and personal host and central server) is meant to include any computer system when a system which includes the present invention operates in a peer-to-peer configuration.

This scheme offers a method and framework for matching people's interests and building personal connections to the right people and information they value. Getting the right person's attention is what really matters and is a necessity for creating almost any type of value. However, in the real world, the factors that influence individual and group attention are very complex. The software agents employed as part of the present brokering scheme build on the complexity of human relationships in ways that are transparent to the user.

The brokering scheme also addresses the flip side of attention-getting by protecting personal privacy. Maintaining user privacy is an important issue on the Internet and is likely to continue to grow in importance as more and more people conduct online transactions. The brokering scheme addresses privacy concerns by managing access to attention because the scheme is based on the understanding that the more visible it is possible for a user to be, the more it becomes necessary for that user to be selectively visible.

To better understand these features, consider first the illustration shown in FIG. 1. In this figure, a network 10 includes a number of clients 12 and servers. The servers may be divided among primary hosts 14 and central servers 16. Primary hosts 14 may serve a number of local clients 12 while central servers 16 may interconnect a number of primary hosts 14 and/or serve various remote clients 12. Although only a limited number of clients 12, primary hosts 14 and central servers 16 are shown in this diagram, it should be understood that any number or configuration of these computer-based components may be used in various embodiments of the present invention. Further, some or all of these components may exist on mobile platforms, such as handheld computer systems and the like, and in peer-to-peer platforms. The network 10 may be a portion of a much larger computer network or networks, such as a corporate enterprise network or even the Internet. The clients 12 and various servers 14, 16 may be combinations of hardware and/or software configured in accordance with the teachings presented herein and the use of any specific programming language(s) and/or hardware platform(s) is not critical to the present invention.

From the diagram, it should be clear that various intercommunications amongst network elements might take place. For example, communication between clients 12 and primary hosts 14 are quite common, as are communications between primary hosts 14 and central server 16. So too are communications between various primary hosts 14 contemplated, as are communications between central server 16 and clients 12. Indeed, even peer-to-peer communications between clients 12 are contemplated within various embodiments of the present invention. The types of communication links that support these communication paths are not critical to the present invention and may include both wired and wireless communication links, with appropriate communication protocols. Further, the specific routing protocols that are used to ensure delivery of the messages among these network elements are not critical to the present invention and any appropriate routing protocols (e.g., TCP/IP, AppleTalk, etc.) may be used.

Figure 2:
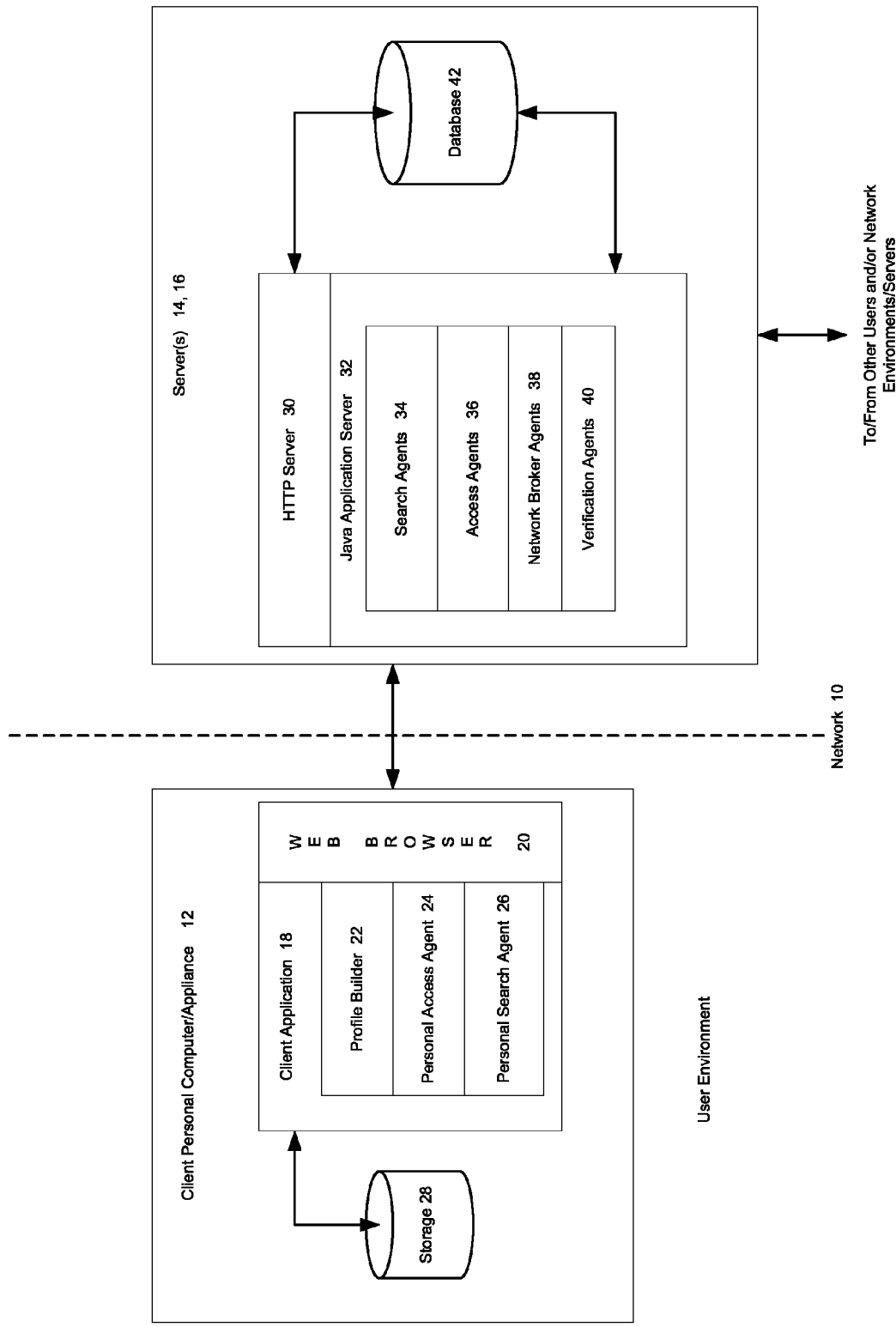
FIG. 2 illustrates a software architecture for client and server components of a Internet-based human network brokering scheme configured in accordance with an embodiment of the present invention.

FIG. 2 illustrates one embodiment of a software architecture for supporting the methods of the present invention. As shown, client 12 includes a client application program 18, which may make use of a conventional Web browser 20, as discussed above. The client application 18 includes a personal profile builder 22, a personal gatekeeper (or "access agent") 24 and a personal search agent 26. Each of these components is discussed in greater detail below. The client application 18 may reside in on-board storage 28 (e.g., main memory and/or a hard drive or other long-term or non-volatile storage device), and this storage unit may also be used for temporary storage of variables, etc. in the conventional fashion. The server-side software (which may reside in primary hosts 14 and/or central servers 16) includes a conventional Web server application 30 (e.g., to manage http requests and other conventional Web server functions) and an application server 32 (which, as indicated above, may be based on Java programming technology). Application server 32 includes various elements, such as search agents 34, access agents 36, network broker agents 38 and verification agents 40. Each of these agents is discussed in greater detail below. Servers 14, 16 also include (and/or have access to) one or more databases 42 which communicate with the http server 30 and the application server 32 and provide storage facilities for these applications. The types of information stored in database 42 by the application server 32 are described below. For example, these databases 42 may contain a secure, composite data structure that maintains information about all users of the system plus a record of prior searches and matches, which the network broker agent 38 can access to learn and reapply successful search strategies.

Many components of the present system may be embodied as Java applets or applications to maintain the richness of an object-oriented approach while using a conventional web browser and HTML (hypertext mark-up language) and XML (extensible markup language) as the delivery platform for the user interface. For compatibility with Java-based interface agents that might be delivered through the user interface, Java application server 32 should dynamically generate the HTML ("compiled HTML"). There should be a high capacity database on or accessible to the server 14, 16, and more limited "persistent store" capabilities on the client-side 12.

1. Client Application

The client application 18 may be distributed as a package (e.g., on computer-readable media or through electronic download) containing the various agents (and a browser, if needed), to be installed in a registry (or similar) portion of the user's personal computer (or other Web-capable appliance) operating system, and stored in a named directory. An alternate version of the client application may also be distributed as an HTML/XML interface residing in the server application 14, 16, and accessed by the user through a Web browser. A basic object hierarchy for the client application 18 is shown below.

InterfaceToUser

This object (although not shown in detail in FIG. 2 as it may make use of components of the Web browser 20) may contain the intelligence described herein for interacting with users to create profiles and search queries and also the interface objects needed to communicate with the local database 28. Examples of graphical user interfaces, which may be generated and displayed using conventional computer graphics rendering techniques, are described elsewhere in this specification.

LocalDB

This is the mapping for the local database 28. Sections of the database may include:

UserStatus. Described above as information regarding completion status of the user profile, and a record of user behaviors and preferences which other objects may make use of to make the user's experience easier and more rewarding, etc.

OrgProfile. The organization profile may be completed once for each organization and may be accessible to each user's client application 18 in that organization. This profile may be completed by a single person or contributed to by multiple people. Some information included in the profile may be dynamically added by the brokering system itself, based on collective responses of organization members. Sections of the organization profile may include:

Capabilities, History, Values (e.g., Culture, and Basic_Values), Goals, Projects (e.g., collected from member profiles, can also be added by a system administrator), Networks (e.g., collected from member profiles, can also be added by a system administrator; subcategories may include Profile_Of_Networks, Contacts (both Internal and External), and Resources)

PersonalProfile. The sections of the PersonalProfile may be very similar to the OrgProfile. Both objects may inherit attributes from an abstract Profile class. The sections of the PersonalProfile may include:

Capabilities, History, Values (e.g., Interests, Style and Basic_Values), Goals, Projects, Networks (e.g., Profile_Of_Networks.

Contacts, ContactProfiles (This database may store profiles of the user's contacts that were either entered by the user or downloaded from a server 14, 16. If the profile was downloaded from a server 14, 16, the profile may contain a link to the copy of the profile stored on the server so that the profile can be updated when it is accessed (as allowed by the profile owner's access agent)).

Access Agent (This database stores general and specialized access instructions and a log of access agent actions and user responses to these actions (e.g., satisfaction, correction, etc.). These will be used to train the access agent 24. Note: The access and security codes (if any) used by the access agent 24 may be stored in the user's Profile).

Searches (This database may store prior search parameters, results, and user responses to results so that searches may be reused, modified, and improved).

InterfaceToServer

This component (not shown in detail in FIG. 2 as it may utilize components of Web browser 20) will allow a user to upload profile sections and agent instructions to the server 14, 16 and download results and other communications therefrom. A database replication and file optimization scheme may also be included. The interface to the server 14, 16 should be closely connected to the client-side access agent 24 to allow for the access control described herein.

a. Profile Builder

The personal profile building agent 22 guides users in the process of building the type of rich profiles discussed above, which are most effective when related to their objectives. The present method also makes it more likely that people will create profiles that will be useful to themselves and others, by making it easy for them to incrementally add to their profiles based on their immediate and changing objectives and personal styles of working Stated briefly, the profile builder 22 is a tool (e.g., a software application or component) that helps users (i.e., people and organizations) reveal their capabilities, projects, goals and values so that others can adequately find and evaluate them. The profile builder 22 is rich and customizable, and may operate interactively, asking people what they want to accomplish, and then helping them build a profile that can accomplish those goals. Each user has control over what goes into his or her profile, who has access to it, and what networks to connect it to. This is significant because in order to make good connections it is as important for others to evaluate a user as it is for that user to evaluate them.

In the client application version, this locally stored application conducts a dialog with its user to build the rich profiles off-line. Data resulting from this dialog is stored in the local database 28 (e.g., a portion of persistent memory of the user's personal computer). In the HTML interface version of the client, all user activity will occur online and data will be stored only on the server. In either case, the resulting database may be encrypted or otherwise secured against prying eyes and file theft. In the client application version, the "local access agent" 24 ensures that only data that the user has designated to be shared gets uploaded to the server 14, 16. Search queries may also prepared off-line, before being uploaded to interact with the server's broker agent 38.

The profile builder may also permit users to generally describe their "relationship networks" in addition to adding specific contacts who are members of their relationship networks. These are networks of contacts, clients, partners, and others with certain, specified expertise, industry affiliations, locations, professions, personal or social interests, or any other user-defined criteria. The use of relationship networks help users better understand and evaluate their own networks, make it possible for other users to search for and evaluate potential targets, based on the types of networks they have, and helps other system users search for likely connectors to potential targets, even where users have not yet entered all of their specific contacts. Data retained in relationship network portions of a profile and related contact information may be automatically updated (e.g., using conventional database reconciliation methodologies) whenever users connect to a primary host 14 or a central server 16. That is, profile information of other users that are within a user's relationship network may be automatically updated so as to ensure a user always has a most recent copy of the other users' profile information. Of course, such automated updating may be subject to the same types of access controls described herein.

As part of a relationship management section, users may undertake activities to manage this section, including importing or manually entering contact records, adding hyperlinks to connect to, import from and browse accessible parts of profiles created by their contacts, describing relationships to their contacts, viewing graphical displays of information concerning their contacts (including, perhaps, the relationships of contacts to one another), keeping notes on interactions with said contacts, and other relationship management activities.

A relationship management agent (which may be a part of the profile builder) may continually analyze a user's interactions with his/her contacts (e.g., by monitoring email communications, various searches and results, through user notes, etc.) in order to determine the importance and nature of these contacts. This will provide for advanced contact management. Thus, contacts may be automatically categorized (using various criteria) and such categories dynamically updated in response to changes in a user's profile, a contact's profile, etc.

Profile information may also be updated according to a user's current projects and other business or personal information. Thus, within the profile builder 22 one or more sections may be designated for a user to describe current or ongoing projects and to include in these project areas information related to the kinds of skills and abilities and other characteristics they are seeking for project team positions (and corresponding open positions) and, optionally, links to the profiles of system users that may be filling current team positions. Such information may then be used to launch searches for new team members.

As demonstrated by the example below, it is important for the user interface to respond to differences in user objectives, style and context, and to changes in these factors over time. To accomplish this, users may be queried on their objectives and preferences in their initial session with the client application 18 (e.g., in an "orientation interview" conducted by/through the user interface to the profile builder and/or search agent) and/or in subsequent sessions. Advanced functionality may also include monitoring a user's behavior to detect style and preferences. Information about user objectives and preferences may also be stored in the local database 28, along with the user's profile completion status, information about how the user has used the brokering system in the past and results of such use, and possibly also the user's satisfaction with the results.

Information about the user's objectives and context (e.g., industry or profession, country, etc.) may be used to select and customize prompts to present to the user, and (in some embodiments) to make suggestions or offer information to the user. For example, information collected on the user's organization type and profession may be used to select prompt variants. Information on the user's objectives may be used to guide the user to complete sections of the profile that will be most necessary for achieving those objectives, and to optionally skip sections that are not essential for his/her objectives. Information on the user's completion status may also be used, alone or along with user objectives, to guide the user to complete the next most important section when s/he logs in next. User completion status may also be used to reward users for profile completion and for the value that this provides to other users.

In addition, the profiles may include "knowledge-sharing" sections. These sections enable knowledge sharing and searching for knowledge by system users. Users may record important knowledge resources such as web addresses, books, journals, databases, and files, any or all of which may be associated with and hyperlinked (or otherwise linked) to portions of their profiles. The user may then allow partial or full access to these resources, allowing for searches on knowledge-based criteria. In some cases, a separate "knowledge profiling agent" may be used to facilitate such searches and/or to automatically profile and categorize such knowledge resources among system users.

The interface may also respond to differences in people's style and preferences. For example, a task-focused person who wants to cut to the chase and solve an immediate problem may get a more minimal set of initial questions than, say, a more curious or expressive person who wants to carefully construct his/her profile. In the case of the quick-start person, the interface may cut the orientation and profile building to a minimum and quickly find what the user wants to do. For example, if the user wants to find a particular type of contact, instead of asking him/her a lot of questions about himself/ herself, a search profiling agent 26 may ask the user simply to profile the person s/he wants to contact. This will get the user familiar with the basic elements of a profile. Then the search profiling agent may remind the user that that person s/he is looking for will probably need to know some things about him/her. This will give the profile building agent a task-focused reason to get the user to start profiling himself/herself. Then, in later sessions, the profile building agent can gradually prompt the quick-start user to fill out more of his/ her own profile. For example, when results come back from a search and a good prospect wants to know more about the user, then the user will have to reveal more information in order to complete that connection.

This type of personalization generally requires an intelligent, dynamic and non-linear interface. The present brokering system includes software tools that contain the intelligence (rules, etc.) needed to respond to user preferences, context, and objectives. Since each question presented to the user in each profile section will be an object, the interface may dynamically select which questions and prompts to display, how to number them, etc., based on accumulated information stored in the local database 28.

b. Personal Access Agent

This tool allows users to protect the information in their profiles and their attention from inappropriate access, and makes these personal profiles connectable. For example, the client access agent ("Personal Gatekeeper") 24 ensures that data marked with an access code for use only by the owner thereof, will not be shared with the server 14, 16. The client access agent 24 will also respond to requests by the server 14, 16 for information stored only in the local database 28, or for specialized responses to search results (e.g., requests for additional information or actions by the user). Advanced functionality in some embodiments may include the ability to filter all types of incoming information and requests for the user's attention, including email. The access agent 24 may also be trainable—learning from both direct instructions by its owner and by "observing" its owner's behavior.

Personal access controls that put control over access to personal information in the hands of the user, not a centralized system administrator, are also provided. In other systems, a system administrator usually controls access control, for the purpose of protecting the organization, not for protecting individual users. The present brokering system, however, may utilize a set of default security values for different profile sections. Users can then adjust these defaults before they begin to complete their profile, and also as they build and edit the profile, thereby giving instructions to their access agents 24 on how to protect those profile sections. The users are also able to give a security value to a particular detail within a profile section that will override the default section security value. In addition, users are able to customize the default security values by adding additional conditions or rules. The end result is that different sections of a user's profile may have different security codes and/or rules attached thereto, making it easy to share only certain parts of the profile with certain types of people/agents.

The system of security values is matched by a method of applying access codes to individuals, organizations, or groups defined by customizable sets of criteria. Users are able to access any parts of another user's profile or other protected information that have a security value equal to or lower than the access code that the creator has assigned to them. The personal access control or gatekeeper agent 24 is also able to autonomously determine the level of access to give a party previously unknown to it. Other systems require that all parties, or their organizations, be specifically identified with an access level in advance.

In addition, the present personal access control agent 24 is also able to autonomously interact with other agents, including the network broker 38, and with other users or their agents, via the network broker 38. Other systems of access control lack this type of autonomous interaction.

Building on the above, the present access and security controls may best be described as a "concept-based" methodology. This enables the use of sophisticated autonomous software agent technology, whereby the agents are able to autonomously a) make use of pre-defined concepts to construct and apply new concepts in appropriate ways, and b) discover rules defining new concepts by observing user patterns of behavior.

One embodiment of the present invention may utilize two sets of pre-defined access groups and security settings. The first set is a non-editable "basic" set of access groups that correspond to progressively more restrictive basic levels of security, for example, "Public", "Low", "Medium", "High", "Highest", and "System Only". This basic set of access groups and corresponding security settings, described in more detail below, are designed to be useful for a majority of access and security purposes and to be quickly usable and easily administered by new users.

The second set of pre-defined access groups refer to generalized groups of people for whom many users are likely to want to give special access rights. For example, these may include "People in my employing organization", "Clients", "Potential Clients", "Trusted Professional Organizations", "Trusted Social Organizations", etc. Users are free to edit the rules defining these pre-defined access groups in order to make them more sophisticated or more inline with their own needs. In addition to pre-defined access groups, the system allows users to create customized and sophisticated new access groups and to use these to define new security settings.

The basic access settings may be labeled "Public", referring to others who have no special level of access and who can access only data that is open to anyone; "Low", referring to people whom the user may or may not know but for whom the user has some reason to want to give access to data that has a "Low" basic level of security; "Medium", referring to people whom the user may or may not know but who are members of groups that the user trusts enough to give access to data that has a "Medium" basic level of security; "High", referring to people whom the user knows well, and trusts enough to give access to data with a "High" basic level of security; and "Highest", referring to people who are the user's closest most trusted contacts and who have access to the "Highest" basic level of security. The system also includes a special basic security setting that may be labeled "System Only", referring to data that no human is allowed access to and which may only be accessed by the network broker agent acting on the user's behalf and programmed to follow the user's access instructions. It should be understood that the actual labels for the basic access and security settings might vary from the labels used in this description.

This system has the advantage of giving a profile section or item a single basic security setting that will allow access to all persons who have been determined to have a basic access setting that is equal to or higher than the item's basic security setting. For example, a person with a "High" basic access setting will have access to any data that is protected by a basic security setting of "High", "Medium", "Low", or "Public".

In any case where the user believes that use of one of these basic access groups and security settings is insufficient to protect any data item, the user may use one of the pre-defined access groups to define a corresponding security setting; or may create a customized access group and corresponding security setting.

All of these access groups, that is, the basic access groups, other pre-defined access groups, and user-created access groups, and all corresponding security settings are defined by either simple or complex rules relating to elements in people's profiles, and to the indicators that users select to indicate their relationship to their contacts and to other people who may or may not yet have a profile in the system. This enables these access groups to a) refer to people whom the user may or may not know, b) be automatically applied and updated based on the defining rules, c) be thereby autonomously applied by the user's access agent acting on the client or by the network broker acting on a server to determine access for people whom the user may not yet know or for whom the user has not yet personally assigned to an access group.

Each access group in the system can be conceived of as a sophisticated concept that defines a particular group and a corresponding reason for giving access or triggering some other type of action. Any access group can thus be used a) as a concept to define another access group, or b) to be used inside of a rule to define a complex security setting, or c) to be used inside of a rule to define a condition that should cause the network broker to perform an action on the user's behalf, such as making a particular response to a search, or d) as part of criteria defining the targets for a search. Likewise, any search criteria that have been saved can also be used, in whole or in part, to define an access group, or for any other use of a concept, as previously described. This is why the method of access and security that is part of present invention is described as "concept-based access and security".

c. Personal Search Agent

Search agent 26 is a tool that guides a user in constructing a profile for a search target. Examples of the use of search agent 26 and its corresponding features are presented below.

2. Server Application

Having thus explored the client-side of the present system, the server-side thereof will now be examined. More than one server may be used, for example a broker server and a database server may be separate entities, even if hosted on a common platform 14, 16. As explained above, the broker server may be a Java application server 32 that includes or operates with an HTTP server 30, dynamically serving HTML content and associated Java applets to the client 12. It may also host Java applications that serve the functions of broker server-side agents, including the search agents 34, network broker agents 38, user-instructed access agents 36 and verification agents 40. It should, preferably, interface in a secure fashion with the database 42.

Client applets (e.g., as discussed above) may be stored on the Java application server 32 and delivered to the client 12 on demand in the context of HTML pages. Since these applets may also be stored on the client 12, the server 14, 16 should query the client 12 to determine whether or not the most current version of the applet is present on the client 12 and, if not, provide it.

The application server 32 communicates with associated data structures in database 42 when a client 12 passes new information to be stored therein, and updates the server-side access agents ("Gatekeeper Agents") 36 for that user with new instructions for maintaining secure access to such information. Thus, portions of the user's profiles and access controls therefor may be replicated at database 42 for use by server 14, 16. The application server 32 also accepts instructions from search agents 26, 34, and communicates these instructions to the broker agent 38 during a search process. Upon being notified of a successful match to the criteria of the search, the server 14, 16 communicates back to the client 12 regarding the successful path to the repository of the information (e.g., another server or client) or contacts that satisfy the search. It is desirable that the server 14, 16 be able to request new information (not currently stored in an accessible database 42) from the clients 12 to determine whether a match is possible based on information not yet shared by one or more clients 12; this could conceivably lead to human user intervention and negotiation towards selective release of the information.

Most of the server-side data structures may be stored on the database server 42. The database server 42 may include some or all of the following components:

UserDB
This database may store all the profiles and instructions uploaded by system users. Database sections may include: User_Profiles, Access_Instructions, and Search_Instructions. As these names imply, the User_Profiles section is a collection of duplicate of the portions of the uploaded user profiles created using the profile builder 22. Access Instructions is a replica of the access restrictions and instructions imposed by users on their personal profiles and those of their contacts. These rules are used during a search by the network broker 38 to determine how much or how little information to reveal to a searcher regarding an identified target. Search_Instructions is a store of the rules and other instructions to be followed by the network broker 38 during a search.

SearchResults
This database may store results of searches to be used by the network broker 38 in refining and reapplying any successful search strategies. Personal search agents 26 operating on the clients 12 may also access this database in order to recommend search strategies to the users and prompt for information needed by these strategies.

ExternalServerindex.
This may be a database that will help a server 14, 16 extend searches (e.g., using search agents 34) to external servers. As the number and locations of servers 14, 16 proliferate, a system to index all profiles on the extended system of servers may be useful in order to direct extended searches from one server to another.

a. Search Agents

The server-side search agents 34 are similar to the client-side search agents 26 and assist in creating search queries and the like. The search agents operate in conjunction with the network broker 38 to locate targets that satisfy the search queries. Further details regarding these agents are presented below.

b. Access Agent

The server-side access agents 36 are duplicates of the individual client access agents 24 and evaluate any request delivered by the network broker 38 to determine what information (if any) may be released regarding a corresponding user/contact. This will be the case in response to both searches and browsing functions initiated by clients 12. The server-side access agent 36 may also request any additional information it needs from its corresponding client-side access agent 24 or the users thereof in order to better evaluate what access level to give to a request.

c. Network Broker

The network broker 38 works in two ways. First, it works by emulating a human broker. Multiple parties give human brokers confidential information because they are trusted to never reveal the information without permission of the owner or to only reveal portions of the confidential information the broker knows would be permissible. Likewise, the network broker agent 38 can access confidential information regarding system users and/or their contacts and use it to make highly accurate matches, but will only reveal the information when given permission by each user's personal access or access agent 24. In operation, the network broker 38 searches the User_Profiles database to look for matches against the criteria specified in search parameters sent by a client 12. It then evaluates the closeness of fit to the search parameters for any retrieved entries. If the search parameters specify connection criteria, such as level of trust, type of connection, etc., then the network broker 38 may have to discover and evaluate connection paths between the searcher and the prospective target. For each prospective target found, the network broker 38 should ask for and (if warranted) receive permission from the target's server-side access agent 36 for release of the requested information, which may then be transmitted to the requesting client 12. This process tends to preserve the trust relationship of a human broker.

Figure 3:
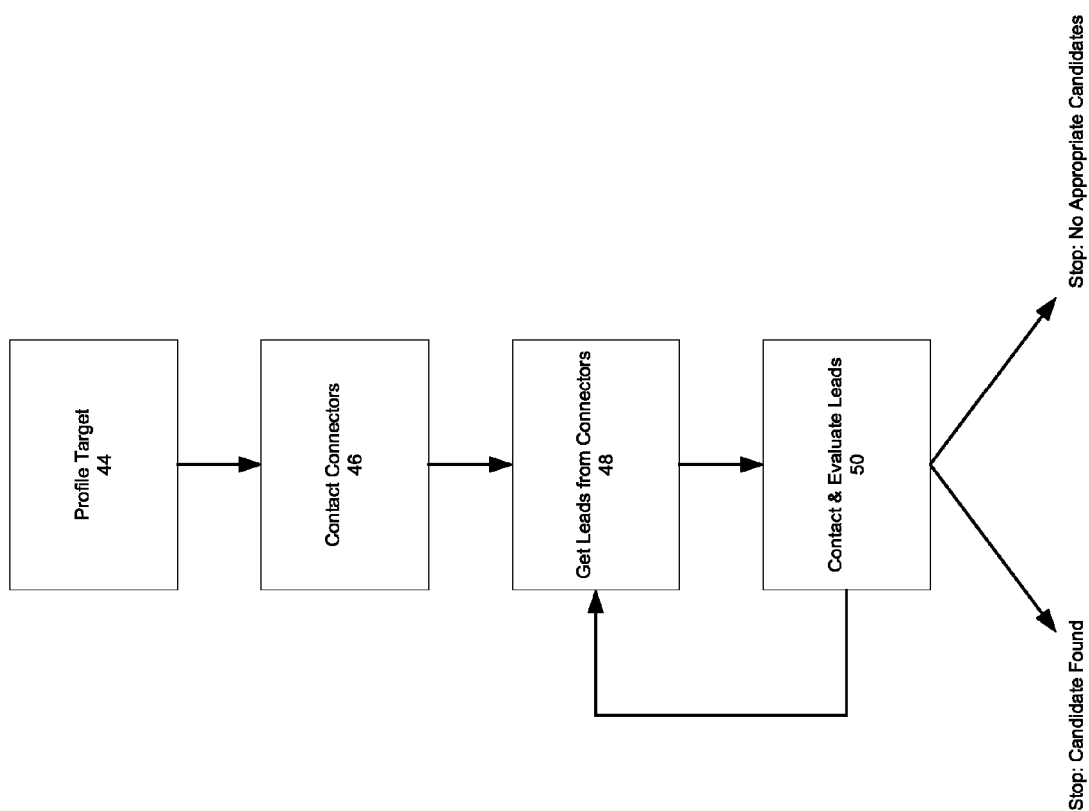
FIG. 3 illustrates one example of a process of human network brokering as performed in accordance with an embodiment of the present invention.

Second, the network broker 38 can follow links based on trust, in the same way that people do when they are "networking"—except of course the automated network broker 38 can do so much more quickly and efficiently than a human being. As shown in FIG. 3, when people network, they naturally start with some idea of a target candidate (step 44) and then look to the people they trust (their contacts) and ask for trusted referrals (step 46). Often they then also talk to the referrals (step 48) and ask them for trusted referrals (and so on until candidates are identified). Each candidate then has to be evaluated (step 50) and this process is repeated until all leads are exhausted or a suitable candidate is found.

Each step in this process involves a link of trust, and so the process is much safer (and, hopefully, productive) than simply looking in a directory. The present networking system can semi-automate this process, and also speed it up tremendously. Other networking systems currently available through the Internet (e.g., those deployed by PeopleStream as discussed above) have portions of this process available, but lack critical features to make the process really work, including rich profiles, sufficiently sophisticated personal access control, and a sufficiently sophisticated network broker. The present scheme combines all of these features, all of which are required for effective social networking.

For example, the present scheme allows for the creation and maintenance of rich profiles (of users and their contacts) that can include detailed data on professional capabilities, history and accomplishments, goals, current projects, and professional networks, and also information about personal background, interests, values, goals and networks. Making successful matches often requires both personal and professional compatibility and high degrees of trust. Tools that lack rich profiles usually provide poor matches and require too much work, and risk, from the users to do extensive additional evaluation. Thus, by providing for the rich profiles used in embodiments of the present invention, the network broker 38 is afforded the opportunity to make meaningful matches.

The present scheme also includes a method for profiling personal networks that is used to guide the network broker 38 in making accurate matches even when the user has not yet entered specific contacts. Profiling a person's networks gives the present network broker 38 the ability to find likely connectors to targets, even when the targets themselves are not yet listed in the system (i.e., in any user databases 28 or any databases 42 maintained at the servers 14, 16). Profiling a person's networks also gives users considerably more information that they will need to evaluate matches that are returned. Knowing what kinds of networks a person has, or is a party to, is often as important as knowing what kinds of capabilities or interests they have. Thus, the broker is a network agent that emulates the function of a human broker negotiating between users' personal search and access agents.

d. Verification Agent and Network

Verification agent 40 is a network agent that authenticates and verifies information users have recorded in their profiles. This agent may work in conjunction with third-party systems such as those available from/through TRUSTe of San Jose, Calif. or US Search of Los Angeles, Calif. The verification agent 40 should respond to any updated verifier information sent by a client 12. For example, the agent may send an email message to each verifier listed by a user, asking the verifier to confirm the user-supplied information to be verified. The verification agent 40 may also receive replies to these messages and evaluate them. Finally, the verification agent 40 may place a "verification stamp" in a section of the requesting user's profile containing the results of the evaluation. This verification stamp should be editable only by the verification agent 40 and not by the user or any other entity or application.

The concept of the verification agent 40 can be explained with reference to the following: Virtually every professional in the world uses a resume or curriculum vitae to profile his or her capabilities and to list references. Many professionals and employers are also now using Web services to post and locate resumes. Currently, individuals often list three or more references on their resume and any prospective employer or client who wants to evaluate the resume must personally call each reference and do other forms of due-diligence. Further, each of the referees listed has to give the same (or substantially similar) evaluation to each organization that is checking references in order to be of any value. The present verification agent 40 automates the process of reference checking to eliminate the need for each employer or potential client to call individual references and for each reference to provide the same verification multiple times. In this system the verifier provides a verifying authority with a single verification, which then becomes accessible to any interested parties.

In one embodiment, users/subscribers enter their profiles into the system using the profile builder 22 in the fashion described above. Individual profiles may vary from a traditional resume to a rich profile generated using the client application 18. At the same time, these users identify people who can verify their profile (or resume) in general and also, if desired, who can verify specific capabilities, accomplishments, or values. As indicated above, the server 14, 16 communicates with these verifiers by email or other means and ask them to verify the selected profile or profile sections. The server 14, 16 receives and evaluates responses from verifiers, and records the results in the verification section of the user's profile, which can only be edited by the verification agent 40.

Thus, when other users—and their agents—want to evaluate a prospective connection, they may access verification information for the individual or company being evaluated. At minimum they can access a verification rating. If the user's access agent 24 grants them additional access they will be able to access more details of the verification. Users are able to link their profiles to multiple verifying and connecting servers. Profiles are thus fully portable, and are not locked in to a single Web site or organization.

B. An Example

With the above background, it seems now appropriate to explain further details of the present brokering scheme by presenting an example of how it might be used. In the following scenario, a user, Julia, needs to make new contacts to help with a project; her problem is how to make those contacts. As explained above with reference to FIG. 3, making the right new people connections involves three basic steps, each sometimes more difficult than the prior one:

1) Getting a list of candidates.
2) Selecting the most qualified candidates—the ones with capabilities and experience most finely tuned to the user's needs (referred to herein as targets).
3) Getting a target's attention.

The first step (assembling a list of candidates) may be done readily with a good directory or database; but that is about where such tools end. The present brokering scheme addresses the more difficult steps. Assume our exemplary user, Julia, is a senior consultant in a mid-sized consulting firm in New York. The company has offices in Chicago and Los Angeles, and close alliances with other companies in other cities. Julia has targeted as a prospect an international company that she had never dealt with before. To make any progress, she knows she needs access to that potential client in the form of a high level introduction, and probably also some inside information about the prospect's needs for services. She had sent a message and some promotional material and made a follow-up call to the prospect, but the logical contact there was overwhelmed with work and other requests for his attention. He took a superficial look at her materials, said "Sorry, I'm too busy to respond." and then did not want to talk anymore.

Prior to the present brokering system, Julia may have been at a loss for further solutions to penetrate the prospective client. At best, her option might have been to go through her address book and find people she knew who might give her a lead, call each of them in turn, each time explaining her needs, and then follow-up on any leads, which might generate other leads, as well as many blind alleys. Sending a broadcast email or posting a message on the company's discussion server might have helped, but too often such attempted solutions either return little information, or leads that do not really match a searcher's present needs.

With the present brokering scheme, however, Julia can explain her needs once (to her personal search agent 26) and then get the best leads available, without depending on getting her colleagues' attention or full understanding of what she was looking for. If just one of the individuals in the company's alliance network has a good connection to Julia's potential client, the present brokering scheme offers an excellent chance of finding it.

Assume for purposes of this example that Julia's company's network had only recently deployed the present brokering system, so people within the company may still be adding information and contacts. Fortunately, the present system does not require that all members of a network be equally thorough in entering information. In this case, suppose that ¾ of the company's workforce had at least profiled themselves and their networks and entered a few specific contacts. This may lead to, say, 10,000 contacts in the network, of which perhaps some 8,000 or so may be unduplicated.

This is not a vast number of contacts, however, as more and more members of the company enter their information this number will grow. Further, extended networks may also be included to encompass outside contact lists as well. As a result, a total number of contacts in an extended network could easily exceed 500,000 or more, with the potential to grow even larger. Nevertheless, even the 8000 unduplicated, high value, high access contacts is substantial material for the present brokering scheme to work with, especially since the network profiles contributed by participating members also provide considerable information needed to point to likely connectors to most targets. To perform her search, Julia need only perform some or all of the following steps:

1. Enter a summary description of her search (i.e., who/what she wants to connect with, for what purpose, etc.).
2. Profile the target. In this case Julia had the target's name (her prospective client company) and may also enter a profile including other important criteria: location, industry, specific type of company and products.
3. Profile particular target contacts. Here, names of people, roles, and other factors like professional interests that would increase the likelihood of a good match to a person inside of the target company should be provided.
4. Profile likely connectors to the target. For example, specific or general types of members of the target's network: clients, suppliers, partners, advisors, or other associates.
5. Indicate level and types of connection/verification desired. In this case Julia may specify that she wants only close, trusted contacts, and a maximum of two levels of connections.
6. Specify desired results: Julia may want both connectors to this target as well as to other potential targets.
7. Launch the search (and, optionally, also save it for future use in similar situations).

The brokering scheme may then implement the search on the alliance network server 14, 16.

From this search, assume the following results were obtained (again, these are only examples of the types of results that may be provided by the present brokering scheme):

1. Actual connectors to this target. Jane Adams, Chicago Office, was identified as having a close connection to a Vice President in the target organization.
2. Likely connectors to this or similar targets. Names of four people in the network who have close contacts in this industry and with this type of company, or with likely clients of this type of company.
3. Messages from connectors. "Call Jane before you call her contact." Presumably, Julia will be quite happy with these results, especially since developing this list did not take that much of her (or anyone else's) time. With these results she could now make just a few phone calls to exactly the right people.

C. Use Cases

Figure 4:
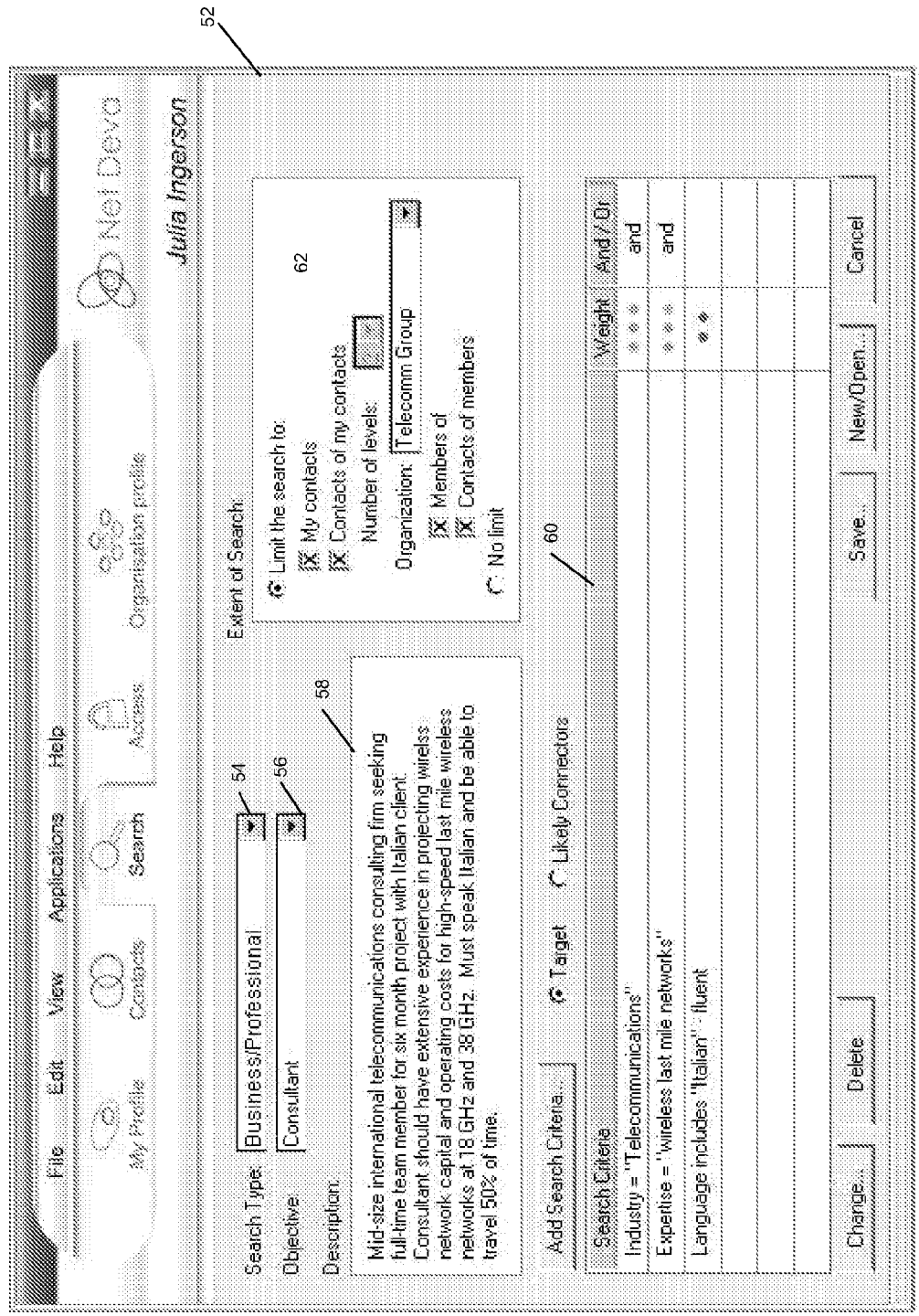
FIG. 4 illustrates an example of a user interface for a search agent configured in accordance with an embodiment of the present invention.

Although the above example of a user, Julia, searching for a contact provided some details of how the present brokering system operates, a more general discussion of the search process may also be helpful. The search agent 26 may present a graphical user interface 52 such as that shown in FIG. 4. Of course, this illustration is only one example of a user interface and many other variants may be used. The precise layout of the user interface is not critical to the present invention. With such a user interface as part of their individual client applications 18, users can enter plain language descriptions (as opposed to complex SQL (structured query language) or other database-specific descriptors) of their search. This can be used for a human readable description of the search by prospective targets, connectors, or human brokers helping with the process. In some embodiments, machine parsing and comprehension of these search terms may be provided.

Users may also enter a pre-selected category describing the search by specifying a general search objective, e.g., "Find Partners" or "Offer Services", or "Exchange Ideas". These categories can be used to help optimize search results and also to group searches for refining search strategies, and to retrieve stored searches. In this example, the search type is specified using an appropriate field 54 as a search for a business or a professional. The objective field 56 indicates that the purpose of the search is to find a consultant and a description field 58 allows the user to enter a rich, textual description of her search. Notice that this rich description need only be entered once during the search process, and need not be repeated numerous times as might be the case if a user were to perform the type of manual search described above.

In addition, to this textual search description, users are prompted for detailed search criteria of both their targets and, optionally, likely connectors to those targets. Such criteria may be entered in a search criteria field 60, thus allowing the user to profile the target organization and/or person to specify the skills, capabilities, compensation requirements, and values that are being sought. The interface for specifying such information may include a place to indicate the relative importance or weight of any profile criteria specified—e.g., required, very important, important, etc. and any Boolean (e.g., AND, OR, etc.) connectors for those criteria. As indicated, users may also profile likely connectors to the target. This is optional but can be important if the type of connection to the target is important, for example, if the user wants a trusted recommendation and introduction to the target Some embodiments of the search agent 26 may include a search profiling agent that may help the user specify the kinds of profile information that are most likely to result in matches for the desired search objective. For example, the profiling agent may be able to recommend what type of connectors to look for, or what kinds of information the target is likely to need in order to respond. If the user is in a hurry and leaves out important sections, the search profiling agent may give the user reasons for completing those sections and ask them to do so.

The extent of the search may be indicated using a search extent field 62. Some searches may have no limits, while others may be directed to just local or other contact groups. For example, users may specify how many levels of contacts a search should return hits for. This is often an important aspect of human-brokered searches for it is unlikely that a user will want to contact a target with only a tenuous connection to the user.

Figure 5:
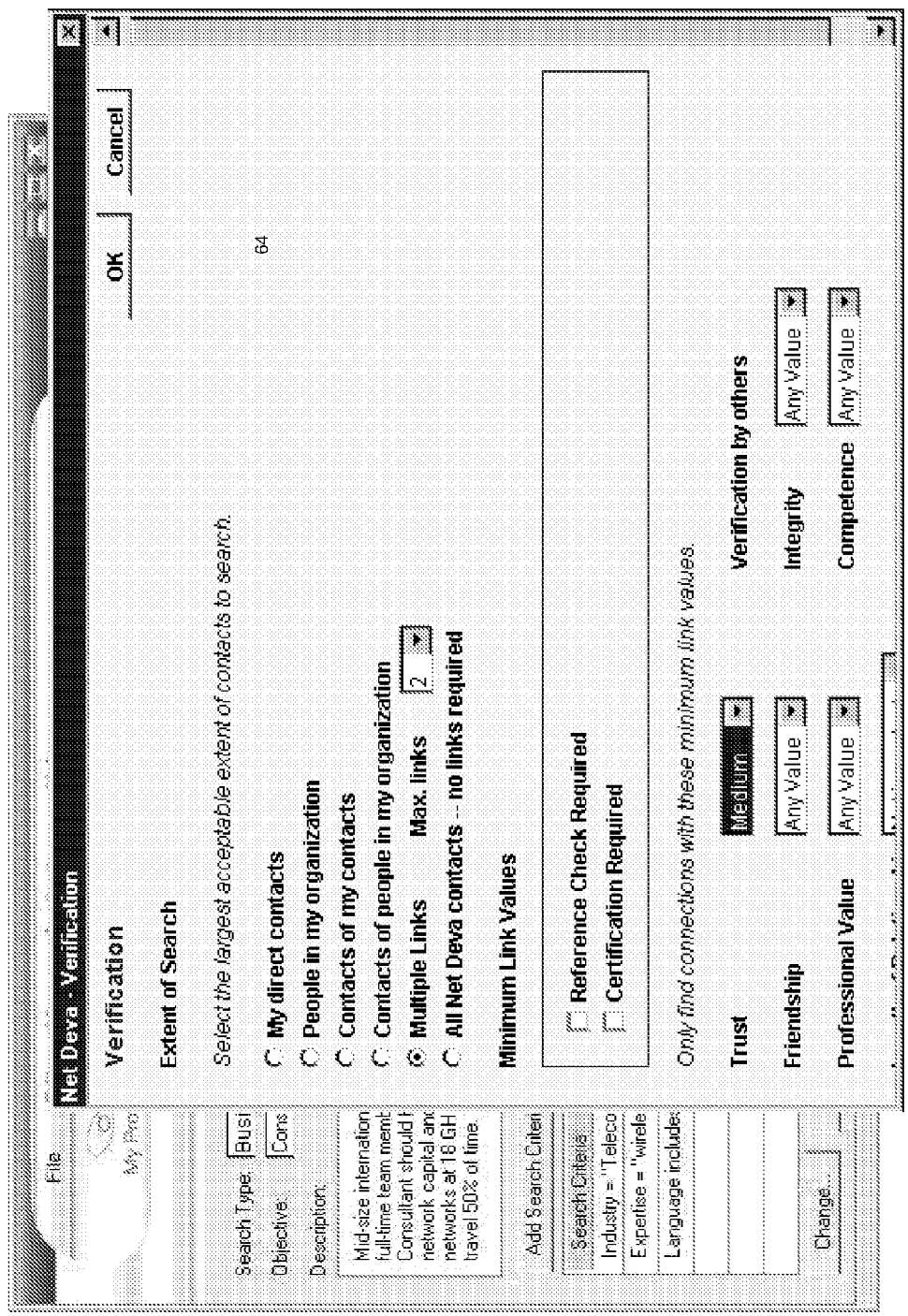
FIG. 5 illustrates a further example of a user interface for a search agent configured in accordance with an embodiment of the present invention.

As shown in FIG. 5, verification parameters, if any exist, may also be specified. The verification instructions will help the broker agent 38 plan its search path (i.e., does the user want to limit the search to:

His/Her own closest connections?
The closest connections of his/her closest connections?
The people in his/her organization?
People in allied organizations?
Connections of people in allied organizations?
The global universe accessible by the brokering system?
Only verified or certified targets?
etc.

Through a series of menu options 64, these and other questions (e.g., level of trust in the connection, etc.) may be asked and answered, thus formulating a complex search procedure using a straightforward user interface.

Figure 6:
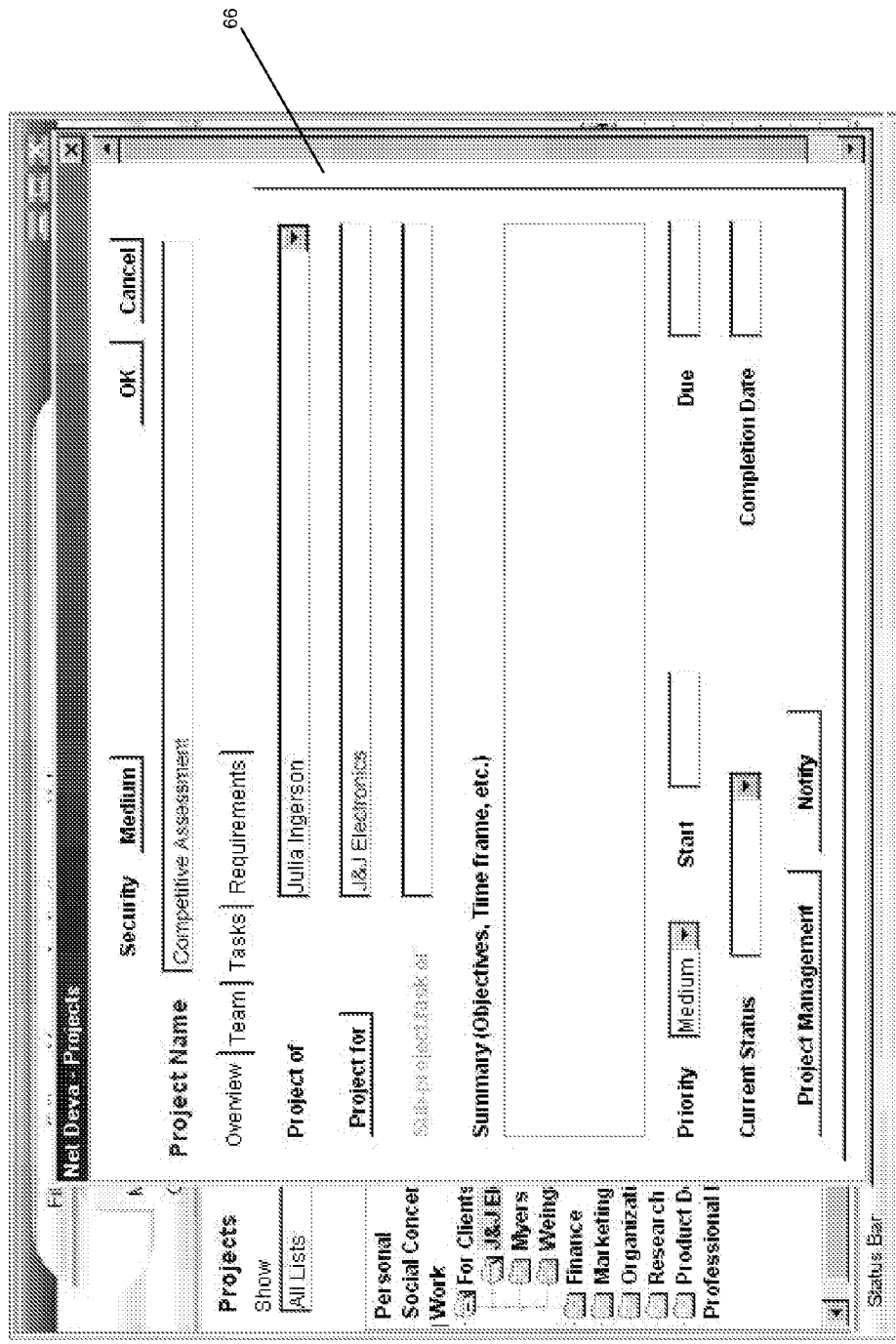
FIG. 6 illustrates one example of a user interface for adding project information to a personal profile of a client application configured in accordance with an embodiment of the present invention.

A search may also be initiated or saved for later use whenever the user adds or modifies his/her own profile information regarding projects, goals, or interests. Projects especially relate to searches if the project has requirements that are not yet filled. After entering project information (see, e.g., the user interface screen 66 of FIG. 6), the user may be prompted, "Do you want to start a search for project requirements?" If yes, the project specifications will be used by the agent as the basis of a search and the user may be prompted for additional instructions needed to carry out the search. Likewise the user can initiate a search for people who share common interests, values, goals, or background.

Ultimately, a user launches the search. The search is preferably first launched on the user's local system 12 to look for matches or likely connectors among the user's own locally listed contacts (including locally listed contacts of other members of the user's organization); next the search is uploaded to the server 14, 16 for a more extended search. An example of a user's personal contact list 68 is shown in FIG. 7.

Figure 8:
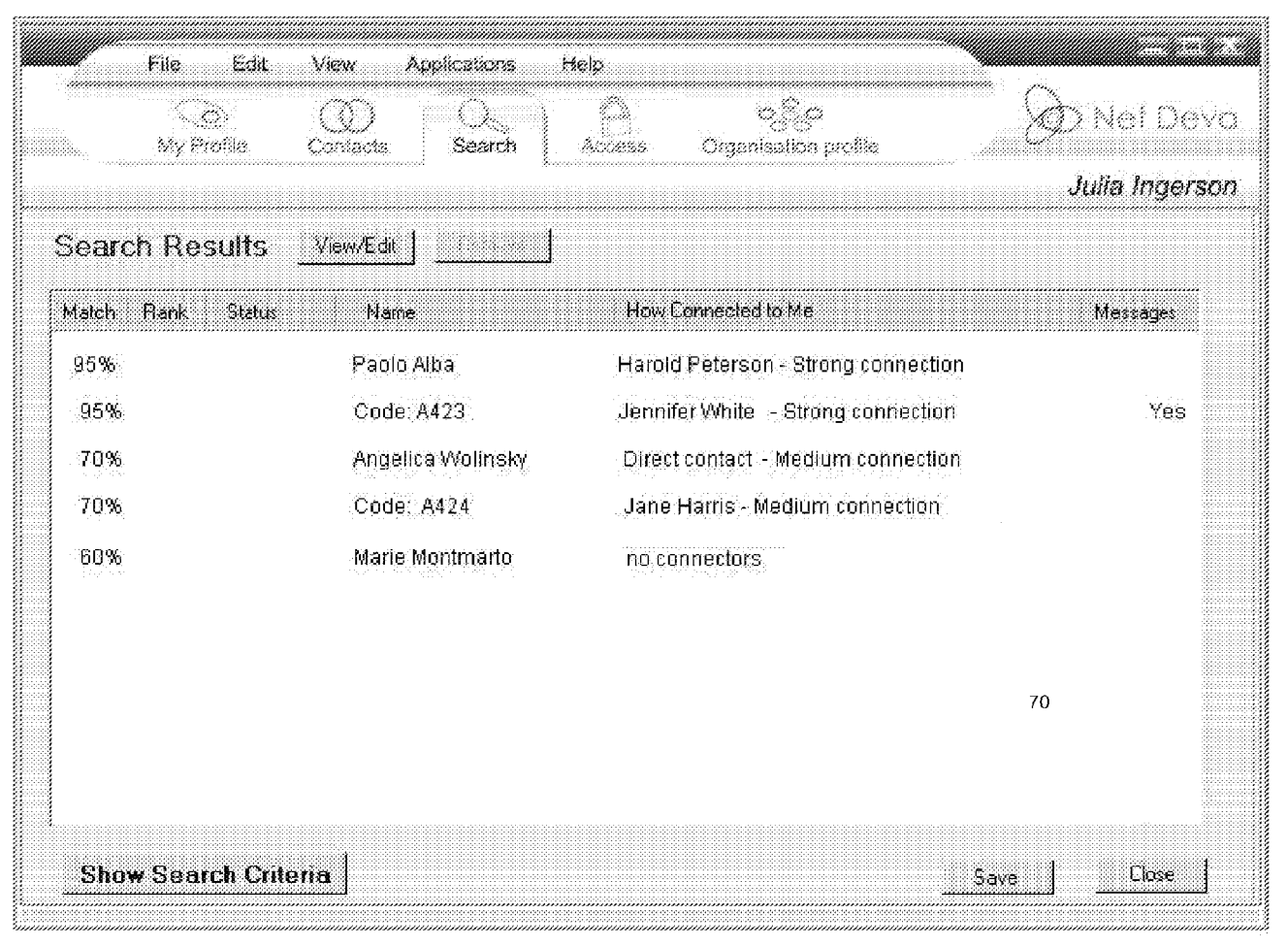

The server 14, 16 receives search instructions from a client 12 and instantiates a broker agent 38 to carry out the search. The broker agent 38 receives search parameters (e.g., through its interface to the application server 32) and responds with search results. An example of a search result screen 70 is shown in FIG. 8.

To perform the search, the broker agent 38 parses the search request into component parameters thereof and conducts a search in the User_Profiles portion of database 42 to try to find best matches. If the search parameters include connection types and weights, then the broker agent 38 will seek connection paths that match the connection parameters. This may include strategies such as: starting with targets and working backward to try to connect to the searcher, via likely connectors; or starting with the searcher's contacts and working outward to try to connect to targets or other likely connectors. Searching proceeds to the levels defined by the search extents entered by the user (or to a default level if none were entered).

Once matches to search parameters are found and evaluated, the broker agent 38 will start with the best targets and likely connectors and negotiate with the target's access agent 36 for release of information about the target to the searcher. The target's access agent 36 will evaluate information which the searcher has allowed the broker agent 38 to reveal in order to determine what level of access to assign to the searcher's request. Based on the access code assigned to the searcher by the access, the access will give the broker agent 38 permission to report back to the searcher any requested information that has a security code equal to or lower than the searcher's assigned access code. In some cases this will be all information requested, in other cases it may include some information but not include specific contact information (name, etc.), in still other cases it may be no information.

If the access agent 36 is interested in the request but cannot assign a high enough access code to the searcher to release the information requested, the access agent 36 may (if previously instructed by its owner) ask the broker agent 38 to query the searcher for the additional information that it needs to release the requested information. This request for more information will then be relayed to the searcher's server-side access agent, which will decide what to do with the request. For example, the searcher's server-side access agent may a) supply the information, b) deny the information, c) send the request back to the searcher's client 12 to request action of the searcher's client-side access agent 24 or directly of the searcher him/her-self. Such additional information supplied by the searcher may then be relayed back to the target's gatekeeper 36 for re-evaluation of the access request. Thus, a system of progressive disclosures of personal information may be used.

If the target's access agent 36 responds negatively (or sub-optimally) to a searcher's request for information, the broker agent 38 may then attempt to find a trusted connection path (i.e., a path through a trusted contact of the target to the searcher) between the searcher and the target (if it has not already done so). If a trusted connection path is found, then the broker agent 38 will submit this additional information to the target's access agent 36 to try to improve the access code assigned. When the broker agent 38 is looking for likely connectors to targets, the broker agent 38 will be asking the connector's access agent for permission to search the connector's contacts for targets or other likely connectors. This will allow the broker agent 38 to conduct extended searches through multiple "degrees" of connection.

Figure 9:
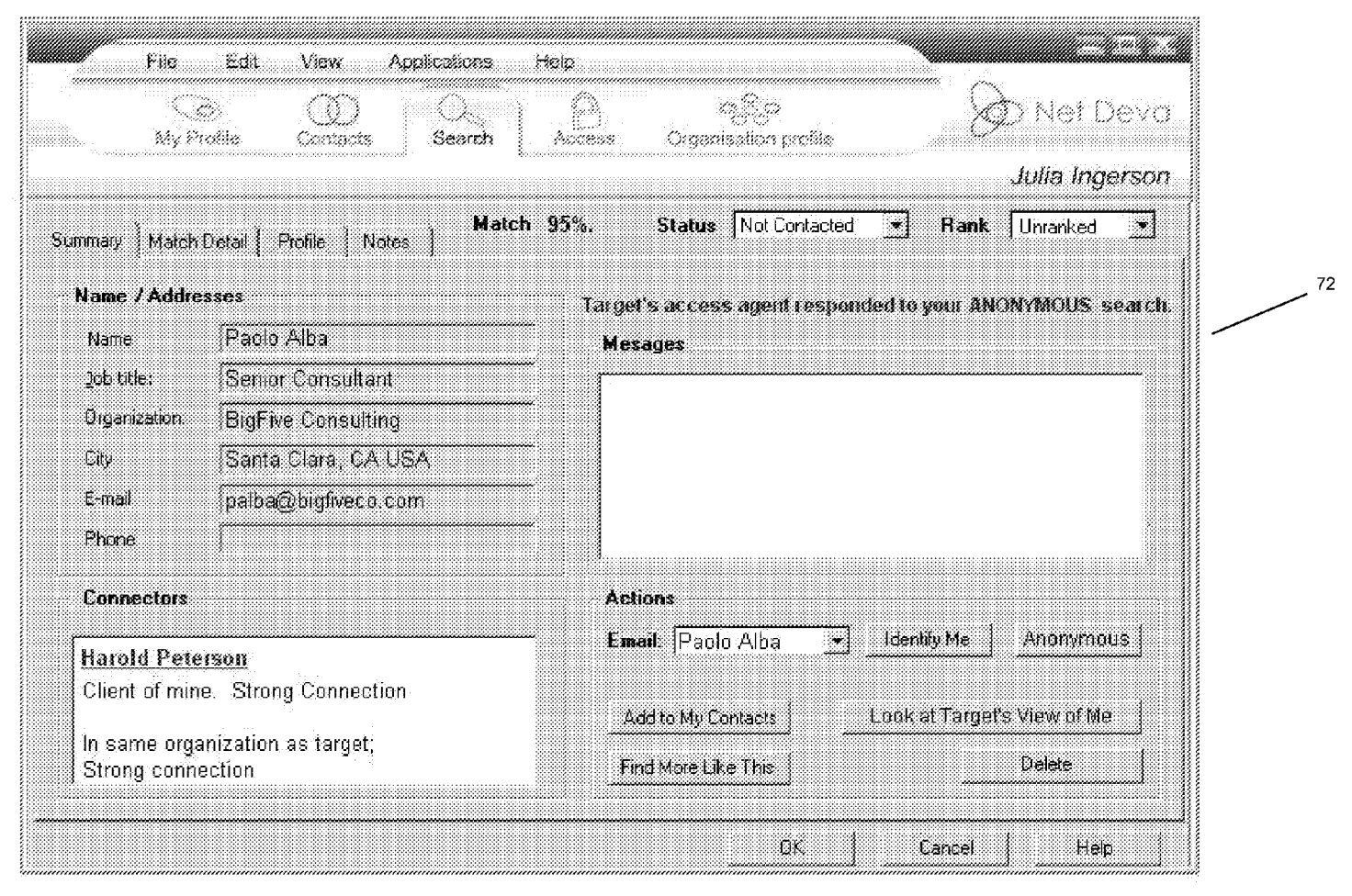

Once results are obtained from target or connector access agents 36, the broker agent 38 will collect all results obtained, rank them (e.g., by correspondence to the weighted search criteria, degree of connection, etc.) and report them back to the searcher. One example of a search result report screen 70 is shown in FIG. 8. From this report, a user may examine detailed information regarding the target. For example, by selecting one of the targets on the search result list, the user may be presented with a detailed view 72 (see FIG. 9) of that target's information (i.e., the portion of the target's profile that was released by the target's access agent 36). In this example, the detailed view 72 includes not only information regarding the target, but also information regarding the connections to the target (which are often important in evaluating a target's suitability). The detailed view screen 72 may also provide for sending messages to the target and/or the connector(s) as well as other functions (e.g., the ability to add the target to the searcher's own contact list, etc.).

In other embodiments, the report back to the searcher may include some or all of the following:

Direct Hits
1. A ranked list of "direct hits" (people, organizations, information that matches the search profile, etc.).
2. Hyperlinks or other links to all relevant evaluation information that is accessible to the searcher (e.g., profiles of targets and connectors, details regarding the match, etc.).

Connectors
1. A ranked list of potential connectors to the target. The highest ranked connectors will usually be people who are most likely to have the strongest connections to direct hits and who also have strongest connections to the searcher.

2. Hyperlinks or other links to all relevant evaluation information about connectors that is accessible to the searcher.

Messages and Requests

1. Messages from potential targets or connectors, such as, "Please contact me personally for more information—or for a personal introduction."
2. Requests from potential targets or connectors asking for more information required to permit more complete access D. Search Strategies Having now been introduced to basic search procedures, some advanced search strategies and techniques may be discussed. Consider first a search for targets, not considering trust links. Users might adopt a strategy wherein searches are based on each or selected search criterion. For example, one might narrow an overall search by searching first on required criteria, such as location, capabilities, or other parameters. Alternatively, or in addition, one might search in the capability section of other users' profiles to match on desired capabilities. Narrow searches may also be conducted by broad industry and function groups and/or in other users' network profiles section to match on type of clients, and other network types. Likewise, where certain educational requirements are important in the target, one might search in a history/education section of a profile to match on education criteria. Searches in interests/values sections may be used to match on these criteria, and so on.

Searches may include both searches of structured fields and indexed text searches in text fields or "tagged" text files or tagged sections of text files (e.g., sections of resume text files that are tagged as "capabilities", etc.). Some text fields used in profiles may contain unstructured text fields, however the scope of these fields should be defined, such as "Current Skills." They may also be defined by association with structured fields indicating, for example, particular industries or functions.

Once such searches are run, users should evaluate and record the strength of match for each criteria. Matches may then be grouped by target (organization or person) and combined into one "record" or object per target, giving the strength of match on each criterion. (Note, some or all of these steps may, of course, be combined in one operation per target.) Finally, an overall match ranking should be assigned.

Next, one should discover trust links to targets and likely connectors. This could be done as part of the above process if minimum trust links are specified as part of the search requirements. However, even in that case it may be desirable to use the above search procedure (without regard for trust links) as a way to narrow the universe of possible targets before the more resource intensive process of discovering trust links.

To work with trust links, one may start from the searcher and follow links with minimum trust outward no more than x (say 3) degrees, or less if fewer degrees are specified in the search parameters. Thereafter, one may start from targets identified by the above search process and follow minimum trust links outward the same number of degrees.

Note, these procedures will involve "extended searches" which may require personal access agent (gatekeeper) approvals, i.e., to explore links of a connector. This may be required because in order to release information on link paths, the broker agent 38 will ultimately need each connector's access agent approval for release of this information. Thus, one can ignore link owners who do not want to participate in an extended search. In some cases, it may be that the link owner has not gotten around to including the link requestor in his/her access instructions or that his/her access instructions are not very complete. In such cases, it may be preferable to do the extended search first and then ask permission. Asking permission may involve getting the user's attention, which could take time and delay or fragment the search process.

After performing the two branches of the extended searches, one then looks for matches between potential link connectors. Any matches can be ranked according to search path link criteria, e.g., strongest links, fewest degrees, etc. When searching for likely connectors, one can search all links available, if system resources and time permit. Or one can constrain a search by using a refined "likely connector" strategy that takes into consideration programmed and learned information about likely connectors, plus consultations of network profile sections of potential connector profiles. These extended link search strategies will not only locate any known link paths in the system, but will also be used to identify "likely connectors" that do not directly link to a target. Such likely connectors may indeed link to targets, but available linking information may be missing. Or, likely connectors may link to targets who are not actual users in the system. These connectors can then be contacted by the searcher (if permitted by the connector's access agent) for help in making connections "outside" of the brokering system.

When looking for likely connectors, some other possibilities are:

Look for likely connectors to identified targets.

Look for likely connectors to 1st and 2nd degree connectors to target's 1st and 2nd degree connectors.

Look for likely connectors to the target profile.

Finally, the results may be assembled and evaluated based on the above search processes. This procedure will combine weighted connection criteria with other target profile criteria. As stated above, this will be useful even when weighted connections are not required in the search parameters. By having information on weighted connections one is afforded added value in the search results—value that the searcher may not have anticipated. Further, weighted connections, e.g., links of trust, may prove valuable for getting a target's (or connector's) access agent to release information to the searcher.

E. Algorithmic Details

The following section presents a object view of the above described search process and is intended to more fully communicate to those of ordinary skill in the art an example of the algorithmic structure of an embodiment of the present invention. It is not intended that this description be a fully coded version of a software application; rather, it is intended to highlight some of the important features of an embodiment of the present invention.

1. Object Model Overview:

Client application 18 contains (in addition to PersonalProfile, etc., which are discussed above):

a. ClientSearchDeva—which receives search parameters through the search agent user interface described above, conducts searches on local database 28, and assembles SearchInstructions for sending to server 14, 16.

b. InterfaceToServer—which sends and receives messages, objects and data to the server 14, 16. This object interacts with the search agent 26 and local database 28 and with other client objects such as the ClientSearchDeva.

Application Server 32 contains (in addition to the objects noted above):

a. InterfaceToUser—which receives input from clients 12, including searches, and sends results and messages to clients 12, including search results. In the case of an incoming search, this object will send a message to the network broker 38 to cause it to instantiate a new NetworkBroker object to carry out the search.
b. NetworkBroker—this is a class of objects instantiated to handle each search received. Thus, there may be multiple NetworkBroker objects (i.e., network broker agents 38) active at any given time.
c. SearchDatabase—containing temporarily stored or archived searches and results.

NetworkBroker objects contain:
a. SearchInstructions (received from client 12 through InterfaceToServer and copied to this new NetworkBroker object)
b. TargetFinder—will conduct a simple search to match queries and find all possible targets. TargetFinder will create BrokerResults data object(s), which are discussed below.
c. TargetEvaluator—an object that uses BrokerResults to implement access deva instructions for each target found. It modifies BrokerResults based on evaluation of access codes and security codes to ensure privacy concerns and instructions are addressed and implemented. It will also have other functions in full searchers—e.g., evaluating and scoring weighted searches. (Note—the TargetEvaluator may be implemented as multiple, threaded TargetEvaluators, one for each target.)
d. BrokerResults—a data object (i.e., a private object only known to NetworkBroker) that contains the results of a search. It is not shared with a client application 18.
e. ResultsToSearcher—a data object returned to client application 18 at the conclusion of a search.

2. Details of Objects and Behaviors

Client application 18 will, though the user interface associated with search agent 26, develop a search query. Thereafter, ClientSearchDeva (a system interaction object in the client application 18) will assemble SearchInstructions for the query. The SearchInstructions may include one or more of the following:
A Search Description (if provided by user).
A SearchID (if implemented).
An indication of the type of search (e.g., a browse query, or anonymous, weighted search).
Query conditions to match.
An indication of whether the search request is local only or also to be sent to server 14, 16. If sending the search request to server 14, 16, whether to:
a) Send the instructions now and ask for an immediate search while the client 12 is online
b) Send the instructions now and notify the user when results are found (useful where the user intends to be off-line while search is being conducted).
c) Store the instructions and upload them when the user is next online
d) What data to return with results:
i) Send only target names and links to data on server 14, 16.
ii) Send names, links, and additional data:
Data matching query conditions.
Email, phone, address, etc.
Other profile data as requested.

The SearchInstructions may then be executed to find targets in local database 28 and/or the SearchInstructions may be provided to server 14, 16.

If the search is to be run at server 14, 16, then the InterfaceToClient will receive and acknowledge the SearchInstructions and instantiate a NetworkBroker to carry out the search process on the server. NetworkBroker (i.e., an instance of the network broker agent 38 for a particular search) will use TargetFinder to find targets among other users' profiles stored on or accessible to server 14, 16 or even other servers in communication therewith. Targets are matches to the search queries and may include other users and/or those user's contacts.

If TargetFinder finds any matches among the other users' profiles, it will add a Link ID to BrokerResults.TargetList. If targets are found among contacts of other users, TargetFinder adds a Link ID to BrokerResults.ContactList. Finally, if TargetFinder finds any connector matches among users and/or contacts, it will add a Link ID to BrokerResults.ConnectorList. The BrokerResults lists are not shared with objects outside of the NetworkBroker assigned to a particular search. This preserves the privacy that would be afforded by a human broker. The TargetFinder object will thus include processes to read the SearchInstructions and perform the above steps, as well as data members of BrokerResults (which will include the three lists, TargetList, ContactList, and ConnectorList).

TargetEvaluator will start with BrokerResults.TargetList, and for each target user in the list will:
i. Create a target object in ResultsToSearcher.TargetList. This will be the search result data object returned to the searcher's client application 18.
ii. Check SecurityCodes for the requested data, e.g., name, phone, email, location, data matching query, and any other profile information requested.
iii. If all data requested is "Public" (i.e., a security code that designates the information may be shared with anyone), this data will be added to or associated with the corresponding target in TargetList.
iv. If any data is not "Public", TargetEvaluator will check for the AccessCode assigned by the target (i.e., the actual user represented by this entry in the TargetList) to the searcher.
v. If an AccessCode is not found for the searcher, TargetEvaluator will, optionally, check for an AccessCode for the searcher's organization (e.g., employer or membership associations, etc.). Alternatively, or in addition, TargetEvaluator may check to see if the searcher is a member of one or more of the target's organization. If so, the searcher may be assigned an AccessCode of the organization. Otherwise TargetEvaluator may assign the searcher an AccessCode of "Public" (i.e., the searcher will only be able to access Public information of this target).

Note that the searcher's name and organization(s) may need to be part of the SearchInstructions in order to perform the above-described lookups in the target's contact list. In some cases a more stringent way of verifying that the searcher or searcher's organization matches a target contact may be needed. Note also that the target will not learn the searcher's name for this procedure because the lookup is done by a network broker agent 38. However, in other embodiments targets may need to know when they have been browsed or searched plus any profile information the searcher wishes to share with targets, though not necessarily including the name of the searcher if searcher wishes to remain anonymous.

Carrying on with the above functions performed by TargetEvaluator:
vi. Add SearcherAccessCode found or assigned to target in TargetList. If no SearcherAccessCode found or assigned, set SearcherAccessCode=null for this target.
vii. Add all data to target in ResultsToSearcher.TargetList where SearcherAccessCode>=SecurityC ode.
viii. If the target's name is not accessible (not "Public" or has a SecurityCode higher than the AccessCode assigned to the searcher) then substitute "Person N" (or another anonymous identifier) for the target's name (where "N" is a sequence number, like "A", "B", etc.) Optionally, a temporary Link ID that will be stored in the TargetList may be created. The actual Link ID should also be stored so that the broker agent 38 can retrieve it when later given the temporary Link ID by the client 12.

ix. Repeat these steps for each target in ContactList and ConnectorList. (If desired, find connectors.)

Once the NetworkBroker has completed this search and match process, InterfaceToUser may return ResultsToSearcher (containing SearchID, TargetList, ContactList and ConnectorList). In some embodiments, BrokerResults may be stored in memory (e.g., within database 42) while a user is online in order to respond to user requests to browse detail for particular targets. In other embodiments, after the searcher goes offline, BrokerResults may be stored along with an expiration date, after which it will be purged. BrokerResults contains target objects which contain: SearcherID, SearchID (matching the ID for the search on the client application 18), Link ID to target (user or contact) on server 14, 16, any temporary Link IDs sent with ResultsToSearcher and any SearcherAccessCode assigned by the target to the searcher.

Once the above transpires, client application 18, via InterfaceToServer, receives ResultsToSearcher as ResultsFromServer. Client application 18 then matches the returned SearchID to any stored SearchIDs in database 28. This will indicate which search the results are in response to, including whether results are for a browse (i.e., a general inquiry) or a search action so that client application 18 can implement the necessary procedures.

For browse results from server 14, 16, if a query in the selection criteria table is the same as the query for the results (i.e., a match exists between SearchID in a stored search request and the SearchID in ResultsFromServer), then the results of the query are displayed in a browse table. For example, a table such as that shown in FIG. 8 may be used. If the user wants to view details for a result, then after selecting the target of interest, a lookup may be performed to locate the user or contact in the local database 28 or remote database 41, as appropriate, and the accessible data displayed.

Optionally, if a query in the selection criteria table is no longer the same as the query for the results, then a message may be displayed informing the user that results for the query (using the query description if available) have been received from the server, and asking whether the user wishes to view the results now or later. If now, then the browse table may be cleared and the new query displayed in the selection criteria table and "contacts of" list, and results may be displayed in a contact browse table.

Thus, a scheme for brokering human networks over a computer network that may use a client-server paradigm has been described. Although discussed with reference to certain illustrated embodiments, it should be recognized that the present invention is only to be measured in terms of the claims, which follow.

I claim:

1. A computer-implemented method, comprising searching a first descriptive personal profile of a target user of a computer-based social network, which social network includes defined relationships of mutual trust established between owners of descriptive personal profiles that collectively define said social network, said searching being performed according to one or more attributes selected from a designated one of said owners' descriptive personal profiles;

determining, as a result of said searching, whether or not corresponding attributes exist in said target user's descriptive personal profile;

if said corresponding attributes exist in said target user's descriptive personal profile, then identifying likely social network connections between a user responsible for invoking said searching and the target user, said social network connections being said defined relationships of mutual trust established between said owners; and providing said a user responsible for invoking said searching a description of said likely social network connections between the user and the target user.

2. The method of claim 1, wherein said attributes include information pertaining to degree of connections between said target user and said owners.

3. The method of claim 1, wherein changes to said owners' descriptive personal profiles prompts an automated search for new commonalities between said personal profiles and said target user's descriptive personal profile.

4. The method of claim 1, wherein said attributes include information pertaining to strength of connection between said target user and said owners.

5. The method of claim 1, wherein said target user is beyond a user-definable degree of connection to a user of said social network.

6. The method of claim 1, wherein owners' descriptive personal profiles having corresponding attributes to said target user's descriptive personal profile are reported according to strength of connection between said owners and said target user.

* * * * *